US011382081B2

(12) United States Patent
Kim et al.

(10) Patent No.: US 11,382,081 B2
(45) Date of Patent: Jul. 5, 2022

(54) METHOD AND APPARATUS FOR SYSTEM INFORMATION ACQUISITION IN WIRELESS COMMUNICATION SYSTEM

(71) Applicant: Samsung Electronics Co., Ltd., Suwon-si (KR)

(72) Inventors: Young-Bum Kim, Seoul (KR); Ingale Mangesh Abhimanyu, Bangalore (IN); Gert-Jan Van Lieshout, Middlesex (GB); Yong-Jun Kwak, Yongin-si (KR); Jeong-Ho Yeo, Suwon-si (KR); Ju-Ho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/270,636

(22) Filed: Sep. 20, 2016

(65) Prior Publication Data

US 2017/0111886 A1 Apr. 20, 2017

(30) Foreign Application Priority Data

Oct. 16, 2015 (IN) .......................... 1088/KOL/2015

(51) Int. Cl.
*H04W 72/04* (2009.01)
*H04W 48/14* (2009.01)
*H04W 84/04* (2009.01)

(52) U.S. Cl.
CPC ......... *H04W 72/042* (2013.01); *H04W 48/14* (2013.01); *H04W 84/042* (2013.01)

(58) Field of Classification Search
CPC ........... H04W 52/146; H04W 52/0206; H04W 72/042; H04W 72/04; H04W 72/0453;

(Continued)

(56) References Cited

U.S. PATENT DOCUMENTS

2008/0219214 A1* 9/2008 Chen ..................... H04W 88/04
370/331
2009/0323607 A1* 12/2009 Park ..................... H04B 7/2628
370/329

(Continued)

FOREIGN PATENT DOCUMENTS

CN 102113239 A 6/2011
CN 201967138 U 9/2011

(Continued)

OTHER PUBLICATIONS

European Search Report dated Jun. 28, 2018, issued in European Application No. 16855765.0-1214 PCT/KR2016011537.

(Continued)

*Primary Examiner* — Ricardo H Castaneyra
(74) *Attorney, Agent, or Firm* — Jefferson IP Law, LLP

(57) ABSTRACT

The present disclosure relates to a pre-5th-generation (5G) or 5G communication system to be provided for supporting higher data rates beyond 4th-generation (4G) communication system such as long term evolution (LTE). Next generation of wireless cellular operation is expected to be deployed in higher frequency above 6 GHz (eg. 10 GHz~100 GHz, also called mmWave and/or cmWave) due to availability of large amount of spectrum bandwidths. The physical layer of wireless cellular system in both DL and UL operating in mmWave/cmWave would be based on new air-interface different from that of LTE-A air-interface because the radio characteristics is different for mmWave/cmWave bands. The wireless system deployed in mmWave/cmWave system is expected to employ DL beam sweeping on broadcast control information to provide cell coverage to the UE which would result in excessive signaling overhead.

16 Claims, 18 Drawing Sheets

(58) Field of Classification Search
CPC ........... H04W 72/048; H04W 72/0413; H04W 72/0406; H04W 84/042; H04W 8/005; H04W 76/021; H04W 76/02; H04W 48/10; H04W 48/16; H04W 88/02; H04W 48/14; H04W 74/0833; H04W 4/90; H04W 74/004; H04W 74/006; H04J 11/0069; H04J 2211/005
See application file for complete search history.

(56) References Cited

U.S. PATENT DOCUMENTS

| | | | |
|---|---|---|---|
| 2010/0027466 A1 | 2/2010 | Mustapha | |
| 2010/0325226 A1* | 12/2010 | McBeath | H04W 56/00 709/206 |
| 2011/0149897 A1 | 6/2011 | Youn et al. | |
| 2011/0170503 A1* | 7/2011 | Chun | H04W 74/006 370/329 |
| 2011/0237218 A1* | 9/2011 | Aoyama | H04H 20/59 455/404.1 |
| 2011/0280223 A1* | 11/2011 | Maeda | H04W 4/08 370/335 |
| 2012/0163305 A1 | 6/2012 | Nimbalker et al. | |
| 2012/0320874 A1* | 12/2012 | Li | H04W 48/12 370/331 |
| 2013/0083753 A1* | 4/2013 | Lee | H04W 72/0453 370/329 |
| 2014/0098761 A1* | 4/2014 | Lee | H04W 74/006 370/329 |
| 2014/0211680 A1 | 7/2014 | Seok et al. | |
| 2015/0256995 A1* | 9/2015 | Rune | H04W 8/186 455/418 |
| 2015/0312805 A1* | 10/2015 | Cui | H04W 36/0061 370/331 |
| 2016/0157267 A1* | 6/2016 | Frenne | H04B 7/086 370/329 |
| 2016/0192323 A1 | 6/2016 | Kim et al. | |
| 2016/0212697 A1 | 7/2016 | Jung et al. | |
| 2018/0227832 A1* | 8/2018 | Da Silva | H04W 48/08 |

FOREIGN PATENT DOCUMENTS

| | | |
|---|---|---|
| CN | 102835171 A | 12/2012 |
| WO | 2009/116789 A1 | 9/2009 |
| WO | 2014/104632 A1 | 7/2014 |
| WO | 2015/016530 A1 | 2/2015 |
| WO | 2015/020300 A1 | 2/2015 |
| WO | 2015/030558 A1 | 3/2015 |

OTHER PUBLICATIONS

Chinese office action dated Jan. 16, 2019; Chinese Patent Application No. 201680060416X.
European Office Action dated Feb. 6, 2019, issued in European Patent Application No. 16 855 765.0-1214.
European Office Action dated Oct. 25, 2019, issued in European Patent Application No. 16 855 765.0-1214.
European Office Action dated Sep. 10, 2020, issued in European Application No. 16855765.0.
Indian Office Action dated Feb. 8, 2021, issued in Indian Application No. 201634035196.
Extended European Search Report dated Mar. 29, 2021, issued in European Application No. 21161073.8.
LG Electronics, "Text Proposal on Coverage Enhancement for a MTC UE", 3GPP TSG RAN WG1 #72 R1-130264, St Julian's, Malta, Jan. 28-Feb. 1, 2013.
Chinese Office Action dated Apr. 25, 2021, issued in Chinese Application No. 201910986973.X.

* cited by examiner

METHOD AND APPARATUS FOR SYSTEM INFORMATION ACQUISITION IN WIRELESS COMMUNICATION SYSTEM

CROSS-REFERENCE TO RELATED APPLICATION(S)

This application claims the benefit under 35 U.S.C. § 119(a) of an Indian Provisional patent application filed in the Indian Patent Office on Oct. 16, 2015 and assigned Ser. No. 1088/KOL/2015, the entire disclosure of which is incorporated herein by reference.

TECHNICAL FIELD

The present disclosure relates to a method and apparatus for system information acquisition in wireless communication system.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System' or 'Next generation of international mobile telecommunication (IMT)-Advanced'.

The 5G communication system is considered to be implemented in higher frequency (mmWave) bands, e.g., 10 GHz to 100 GHz bands, so as to accomplish higher data rates. To mitigate propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network based on mobile relay, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In addition, a 5G wireless system is expected to address different use cases having quite different requirements in terms of data rate, latency, reliability, mobility etc. However, it is expected the design of the air-interface of 5G would be flexible enough to serve the UEs having quite different capabilities depending on the use case and market segment the UE cater service to the end customer. Few example use cases the 5G wireless system is expected to address is enhanced mobile broadband (eMBB), massive machine type communication (m-MTC), ultra-reliable low latency communication (URLL) etc. The eMBB requirements like tens of Gbps data rate, low latency, high mobility so on and so forth address the market segment representing the conventional wireless broadband subscribers needing internet connectivity everywhere, all the time and on the go. The m-MTC requirements like very high connection density, infrequent data transmission, very long battery life, low mobility address so on and so forth address the market segment representing the internet of things (IoT)/internet of everything (IoE) envisioning connectivity of billions of devices. The URLL requirements like very low latency, very high reliability and variable mobility so on and so forth address the market segment representing the industrial automation application, vehicle-to-vehicle/vehicle-to-infrastructure communication foreseen as one of the enabler for autonomous cars.

The physical layer of wireless cellular system in both downlink (DL) and uplink (UL) operating in mmWave/cmWave would be based on new air-interface different from that of IMT-Advanced air-interface to meet the challenging requirements and providing enhanced mobile broadband user experience. IMT-2020 wireless cellular system i.e. 5G system is expected to deliver several 100 Mbps to a few tens of Gbps user experienced data rates in comparison to wireless systems based on international mobile telecommunication (IMT)-Advanced. These very high data rates need to be available ubiquitously across the coverage area. Apart from user experienced data rates 5G wireless cellular system is expected to deliver on other requirements like peak data rate (few 10 of Gbps), reduced latency (down to 1 ms), better spectral efficiency compared to IMT-Advanced system and many other requirements.

The 5G wireless cellular system is foreseen to be deployed in higher frequency bands above 6 GHz (eg. 10 GHz~100 GHz, also called mmWave and/or cmWave) due to availability of large amount of spectrum bandwidths. In the initial phase of deployment 5G wireless cellular system is expected to be deployed in lower frequency bands below 6 GHz using spectrum farming techniques. One of the requirements for 5G RAT is energy efficiency; so the design of system information provisioning needs to address the energy efficiency requirement to minimize always ON periodic broadcast. Another aspect related to broadcasting of system information is high signaling overhead in the context of 5G RAT operation in higher frequency bands (above 6 GHz) where DL beam sweeping operation is inevitable to reach the coverage area of the cell. Broadcasting all the system information on the coverage beams which are subject to DL beam sweeping may lead to excessive signaling overhead.

Therefore another design criterion for system information provisioning needs to address the signaling overhead aspect. For the sake of illustration of disclosed methods for acquisition of system information by a user equipment (UE) it is assumed the air-interface of 5G wireless cellular system would be based on orthogonal frequency division multiple-access (OFDMA) radio access technology (RAT) in DL and UL. However the numerology (i.e. OFDM symbol duration, carrier spacing etc.) of 5G RAT is assumed to be different from the OFDMA numerology of IMT-Advanced system.

SUMMARY

To address the above-discussed requirements of 5G communication systems or IMT-2020 systems, it is a primary object to provide an apparatus and a method for system information acquisition in wireless communication system.

In accordance with an aspect of the present disclosure, a method for acquiring system information by a user equipment (UE) in wireless communication system, the method comprising acquiring at least one system configuration index (SCI) from a primary broadcast channel (PBCH) or a secondary broadcast channel (SBCH), determining a probe resource based on pre-configured parameters or parameters signaled in the PBCH or the SBCH, transmitting a probe request on the determined probe resource, the probe request comprising the at least one SCI, receiving a probe response including at least the system configuration corresponding to the at least one SCI included in the probe request, and applying and storing the at least one system configuration acquired from the probe response.

In accordance with an aspect of the present disclosure, a method for providing system information to a user equipment (UE) by an enhanced node B (eNB) in wireless communication system, the method comprising determining a probe resource based on pre-configured parameters or parameters signaled in a primary broadcast channel (PBCH) or a secondary broadcast channel (SBCH), receiving a probe request comprising at least one system configuration index (SCI) on the determined probe resource, detecting a probe signal based on the probe request, determining whether there is a UE wanting a meaning of the at least one SCI in a cell coverage area of the eNB, and transmitting a probe response including at least one system configuration corresponding to the at least one SCI.

In accordance with an aspect of the present disclosure, a user equipment for acquiring system information in wireless communication system, the user equipment comprising a processor module configured to acquire at least one system configuration index (SCI) from a primary broadcast channel (PBCH) or a secondary broadcast channel (SBCH), determine a probe resource based on pre-configured parameters or parameters signaled in the PBCH or the SBCH, transmit a probe request on the determined probe resource, the probe request comprising the at least one SCI, receive a probe response including at least the system configuration corresponding to the at least one SCI included in the probe request, and apply and store the at least one system configuration acquired from the probe response.

In accordance with an aspect of the present disclosure, an enhanced node B (eNB) for providing system information to a user equipment (UE) in wireless communication system, the eNB comprising a processor module configured to determine a probe resource based on pre-configured parameters or parameters signaled in a primary broadcast channel (PBCH) or a secondary broadcast channel (SBCH), receive a probe request comprising at least one system configuration index (SCI) on the determined probe resource, detect a probe signal based on the probe request, determine whether there is the UE wanting a meaning of the at least one SCI in a cell coverage area of the eNB, and transmit a probe response including at least one system configuration corresponding to the at least one SCI.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Figure 1:
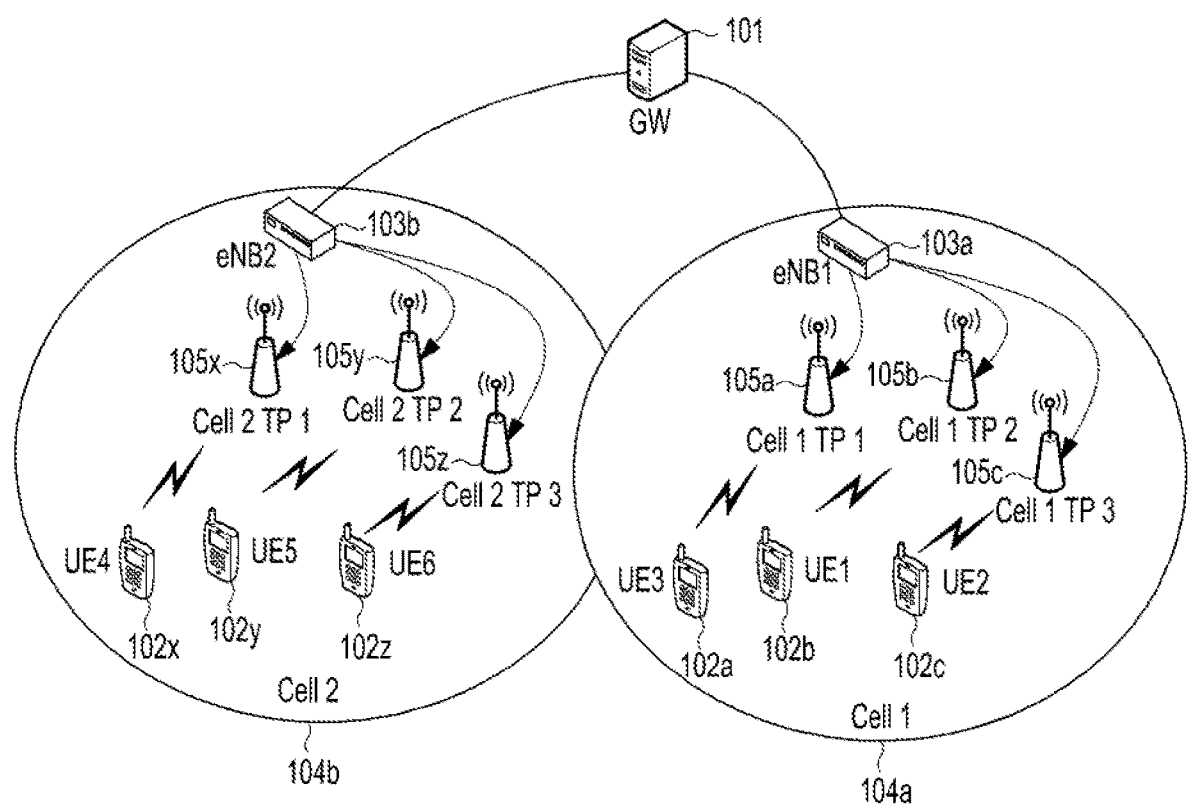
FIG. 1 is an illustration of deployment of 5G wireless system depicting the radio access network (RAN) architecture.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions of certain words and phrases are provided throughout this patent document, those of ordinary skill in the art should understand that in many, if not most instances, such definitions apply to prior, as well as future uses of such defined words and phrases. For example the 5G communication systems or of IMT-Advanced systems is simply referred as wireless system or RAT throughout this patent document. Another example the terminal is referred as User Equipment (UE) throughout this patent.

DETAILED DESCRIPTION

FIGS. 1 through 15B, discussed below, and the various embodiments of the present disclosure used to describe the principles of the present disclosure in this patent document are by way of illustration only and should not be construed in any way to limit the scope of the disclosure. Those skilled in the art will understand that the principles of the present disclosure may be implemented in any suitably arranged communication technologies. Hereinafter, operation principles of exemplary embodiments of the present disclosure will be described in detail with reference to accompanying drawings. In the following description of the present disclosure, a detailed description of known configurations or functions incorporated herein will be omitted when it is determined that the detailed description may make the subject matter of the present disclosure unclear. Terms described later are defined in consideration of the functions of the present disclosure, but may vary according to the intention or convention of a user or operator. Therefore, the definitions should be made based on contents throughout the specifications.

In the present disclosure, the mmWave/cmWave band is considered common scenario for deployment of 5G RAT and hence the procedures are described taking the radio characteristics in those bands. However, in practical deployments it is possible to apply the air-interface of 5G wireless cellular system even below 10 GHz band, therefore the applicability of the 5G RAT and the procedure disclosed in the present disclosure should not be considered strictly limited to mmWave/cmWave bands. Since the radio characteristics is different for frequencies in the mmWave/cmWave bands compared to frequencies in sub 6 GHz bands, it is also expected 5G wireless cellular system would have native support for beamforming techniques for both broadcast and unicast transmissions towards UE to overcome short propagation distances of radio signals at mmWave/cmWave frequencies.

In the present disclosure, 5G wireless system is explained as an example. It is readily understood to those skilled in the art that the various embodiments of the present disclosure are applicable to other communication systems through some modifications without departing from the scope of the present disclosure.

FIG. 1 is an illustration of deployment of wireless system depicting the radio access network (RAN) architecture.

Referring to FIG. 1, the RAN level network architecture consisting of plurality of 5G enhanced node Bs (eNBs) (103a, 103b so on and so forth, or base stations) serving plurality of cell(s) of the 5G wireless air-interface (104a, 104b so on and so forth) in standalone mode is shown. A Gateway (101) can be connected to 1 . . . r 5G nodes of 5G RAT i.e. 5G eNBs (103) for handling the frequency carrier(s) in the cell coverage area. One 5G eNB (103) may be connected to more than one GW (101). Within the coverage of 5G eNB1 and 5G eNB2 (103a and 103b) plurality of UE's (102a, 102b, 102c, 102x so on and so forth) which support multiple RAT functionalities like (GSM, UMTS, LTE) and also 5G RAT functionalities (5G) are served by one or more cell(s) (i.e 104a, 104b, etc). Regardless of the UE support type each UE can access at least one carrier based on 5G RAT.

The 5G wireless cellular system hierarchy would consist of 1 . . . k eNB (103) nodes such that one eNB (103) node consist of 1 . . . m Cell(s). Further, one Cell consists of 1 . . . n transmission points (Transmission Points (TPs) i.e 105a, 105b, 105c so on and so forth) such that the fronthaul between eNB (103) node and TPs (105a, 105b, 105c etc) is ideal. The TPs (105a, 105b, 105c etc) of one cell of eNB (103) will operate to provide 1 . . . p "DL coverage beams". Further, it seems reasonable to assume all TPs belonging to the same cell are "time synchronized" i.e. same radio frame and System Frame Number (SFN) timing. The radio frame duration of IMT-Advanced is 10 ms and the SFN range is 0-1023. The numerology of 5G RAT is assumed such that the IMT-Advanced radio frame is either multiple of radio frame of 5G RAT or radio frame of 5G RAT is exactly 10 ms. Therefore, the SFN range of 5G RAT is either 0-1023 or multiple of IMT-Advanced SFN range. This is needed to support non-standalone deployment of 5G wireless system. It is expected that the initial deployment of 5G wireless system operating in mmWave/cmWave bands would operate as non-standalone system to provide additional radio resources to the UE which would be connected to IMT-Advanced or previous generation system for coverage purpose. With the assumption that 5G wireless system would be added as a capacity layer to existing IMT-Advanced deployments then from the initial standardization phase perspective the RAN architecture would be based on carrier aggregation (CA) or dual-connectivity (DC) framework specified by 3rd generation partnership project (3GPP). In an embodiment of the present disclosure, the radio frame duration of IMT-Advanced system is same as radio frame duration of 5G RAT or the radio frame duration of IMT-Advanced system is integer multiple of radio frame duration of 5G RAT. The maximum number of DL coverage beams 'p' will typically depend on frequency used; i.e. can be larger in higher frequency bands due to smaller antenna separation at the TPs of eNB (103). The cell of the 5G wireless system is identified by a "Cell Identifier (cell id)". The UE can obtain the cell id from the synchronization signal (SS) transmitted by the Cell of the 5G RAT.

It is assumed the UE (102) which supports legacy RAT, IMT-Advanced RAT and 5G RAT is not aware of TPs (105a, 105b, 105c etc) of the 5G wireless system. The TPs operate together to provide beams to the UE and notion of TP is transparent to the UE. Therefore, there is no "TP Identifier (TP-Id)" provided to the UE over the radio of 5G RAT. The UE (102) is aware of cell of eNB (103) and beams covering the cell i.e. the UE shall detect the Synchronization Signal to determine a "Cell Identifier" (cell id) and decode the Beam Index Sequence to determine a "Beam Identifier (beam-id)". Further, two types of DL beams are considered: 1) coverage beams and 2) dedicated beams. The coverage beams provide the coverage for cell (104) of 5G system with a fixed set of directed coverage beams, also called as "grid of beams". Coverage beams cover a relatively wide area, i.e.

they are not very "sharp or directed" and can thus only support relatively low data rates. For example, in a cell (104) there could be less than 10 coverage beams or more than 10 DL coverage beams. As an example, each coverage beam could cover 30-60 degree sector angle such that gird of coverage beams cover 100-200 m radius circular area. Each coverage beam is identified by a "beam id". The coverage beams transmit the synchronization signal (SS) and reference signals for beam signal strength measurements. These reference signals are generically referred as beam reference signal (BRS) and used for radio resource management (RRM) measurements. Coverage beams are used for transmitting DL common channel signaling e.g. RACH response. Coverage beams carry control channel transmissions like enhanced physical downlink control channel (ePDCCH) and user data physical downlink shared channel (PDSCH) can also be transmitted on coverage beams when dedicated beams to the UE have been lost. For demodulation purpose when ePDCCH/PDSCH is transmitted on coverage beam then Demodulation Reference Signal (DMRS) is also transmitted. Dedicated transmissions towards UE (ePDCCH/PDSCH) may potentially use even more directed and sharp beams (e.g. UE specific pre-coding) on so called "Dedicated Beams". Coverage area of dedicated beams would be much smaller in terms of beam width compared to coverage beams (e.g. ½, ¼ or ⅛th of coverage beam area).

Dedicated beams are managed based on UE measurement on channel-state information-reference signal (CSI-RS) and UE provides CSI feedback at PHY layer. To demodulate ePDCCH/PDSCH carried on dedicated beams, DMRS is also transmitted on dedicated beam. Since UE just see DMRS kind of reference signals coming from the cell of the system the notion of coverage beam and dedicated beam is transparent to the UE for PDSCH reception point of view. However, notion of coverage beam is known to UE for reception of synchronization signal. Therefore, when eNB (103) detects UE has lost dedicated beams based on CSI-RS measurement feedback and UE is scheduled data on coverage beam then UE will not be aware that whether the transmission is coming from a coverage beam. To the UE this looks like any other transmission coming from a dedicated beam. Cell edge bitrates on coverage beams will be much lower than cell edge bitrates achievable by dedicated beams. UE transmission in the UL may also be carried on UL beams. However, the number of UL beams is expected to be less compared to the number of DL beams considering the UE size and number of antenna's at the UE.

In the non-standalone mode the Cell parameters of the 5G RAT (i.e system information) which are cell specific like DL/UL bandwidth, TDD configuration, PRACH configuration, PDSCH configuration, physical uplink control channel (PUCCH) configuration, PUSCH configuration, Sounding Reference Signal (SRS) configuration, UL power control configuration, MAC configuration, RLC configuration, PDCP configuration etc. is provided to the UE through dedicated signaling from the Primary Cell (PCell) served by the LTE node. The system information contains the Layer1/Layer2 (L1/L2) configuration which in general is called the SCG configuration information when provided to the UE in non-standalone mode. The system information containing the L1/L2 configuration in general is called the radio resource configuration information when provided to the UE in standalone mode. The SCG configuration information is provided to the UE (102) in a radio resource control (RRC) container through the Master eNB (i.e LTE node) via dedicated RRC signaling from the PCell. In addition the DL beam mobility measurement configuration which includes the CSI-RS configuration including the CSI-RS processes that points to the CSI-RS resource configuration including the non-zero Power (NZP), zero power (ZP) and interference measurement resource (IMR) resources and the reporting configuration is provided to the UE through dedicated signaling from the PCell served by the LTE node. In a standalone mode, the DL beam mobility measurement configuration is provided to the UE directly by the node. Based on the CSI-RS configuration the UE in connected mode should monitor the NZP and IMR resources to perform CSI measurements that includes at least channel quality indicator (CQI), rank indicator (RI), precoding matrix index (PMI), CSI-RS RSRP measurements on the resources configured for the UE. There is no need to provide the UE with intra-frequency configuration, inter-frequency configuration and inter-RAT configuration in the non-standalone mode since the idle mode mobility is supported on the LTE carrier and not on the 5G RAT carrier. However these configurations would be needed in the standalone mode. The terms PRACH, physical downlink shared channel (PDSCH), physical uplink control channel (PUCCH), physical uplink shared channel (PUSCH), SRS for the physical channels of 5G RAT are used for simplicity so that someone with ordinary skills of the IMT-Advanced system can correlate with terms used in IMT-Advanced system.

In the standalone mode of operation of 5G wireless system the cell specific parameters (L1/L2) configuration i.e radio resource configuration and other configurations for idle mode mobility need to be provided the UE. Traditionally in legacy wireless system such parameters are periodically broadcasted in the cell coverage area in the form of one or more system information blocks (SIBs) in addition to the master information block (MIB). On acquiring the MIB and SIBs related to cell access and idle mode mobility the UE can camp on a cell and then start initial access on the camped cell. Table 1 shows the MIB/SIB broadcasted in LTE and the purpose each SIB serve. One of the requirements for 5G RAT is energy efficiency; so the design of system information provisioning needs to address the energy efficiency requirement to minimize always ON periodic broadcast. Another aspect related to broadcasting of system information is high signaling overhead in the context of 5G RAT operation in higher frequency bands (above 10 GHz) where DL beam sweeping operation is inevitable to reach the coverage area of the cell. Broadcasting all the SIBs on the coverage beams which are subject to DL beam sweeping may lead to excessive signaling overhead. Therefore, another design criterion for system information provisioning needs to address the signaling overhead aspect.

TABLE 1

| MIB/SIB | Main purpose |
| --- | --- |
| MIB | Cell access |
| SIB1 | Cell access |
| SIB2 | Radio Resource Configuration |
| SIB3 | Cell reselection |
| SIB4 | Cell reselection intra-frequency |
| SIB5 | Cell reselection inter-frequency |
| SIB6 | Inter-RAT reselection UMTS |
| SIB7 | Inter-RAT reselection GERAN |
| SIB8 | Inter-RAT reselection CMDA2000 |
| SIB9 | Home eNB name |
| SIB10 | ETWS |
| SIB11 | ETWS |
| SIB12 | CMAS |
| SIB13 | MBSFN |
| SIB14 | EAB |

TABLE 1-continued

| MIB/SIB | Main purpose |
|---|---|
| SIB15 | MBMS SAI list |
| SIB16 | GPS/UTC time |
| SIB17 | WLAN |
| SIB18 | D2D Communication |
| SIB19 | D2D discovery |

Figure 2:
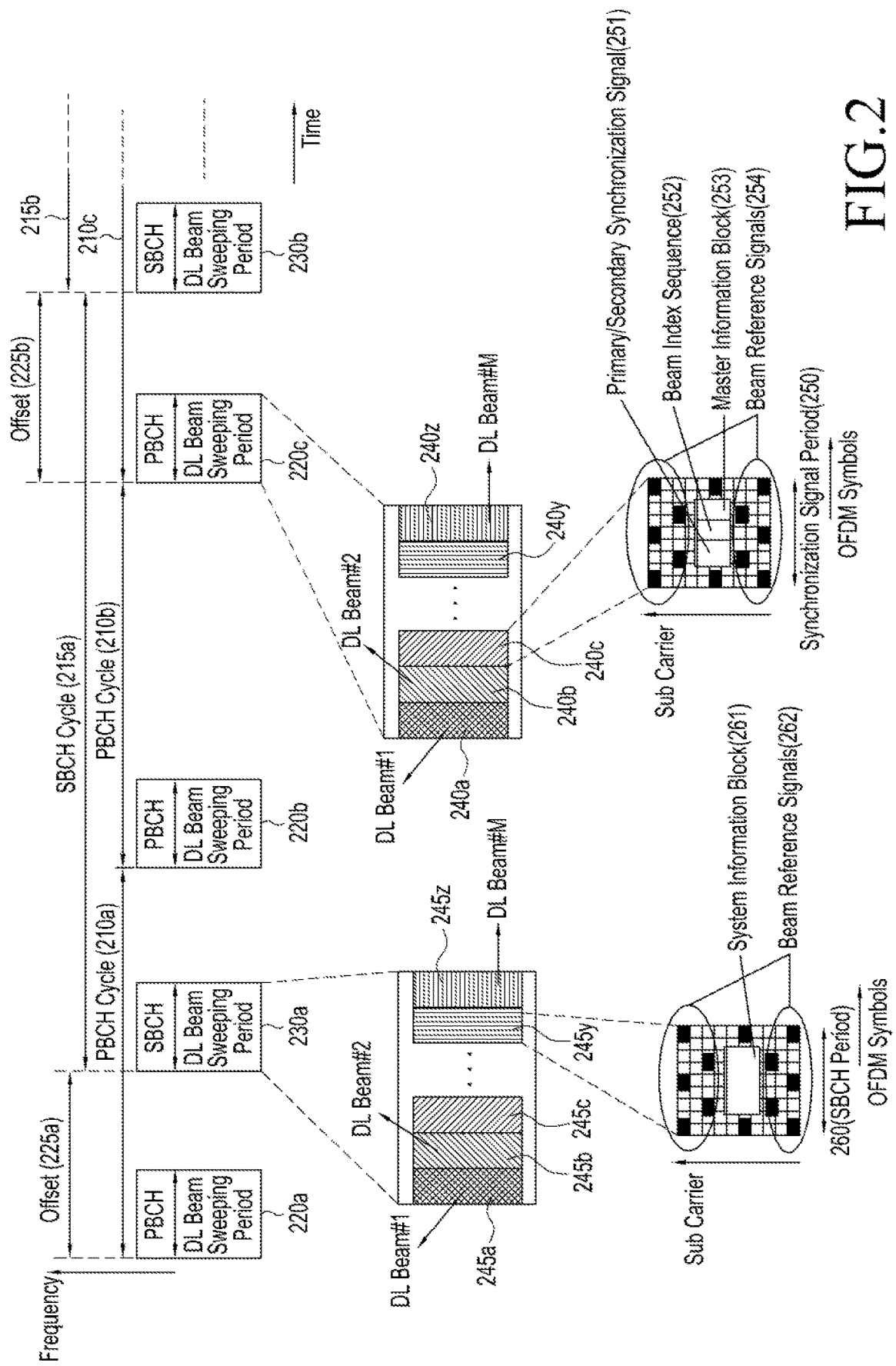
FIG. 2 is an illustration of one example of primary broadcast channel (PBCH) and secondary broadcast channel (SBCH) transmission and beam reference signal from a cell of 5G wireless system according to one embodiment of the present disclosure.

FIG. 2 is an illustration of one example of primary broadcast channel (PBCH) and secondary broadcast channel (SBCH) transmission and beam reference signal from a cell of wireless system according to one embodiment of the present disclosure.

Referring to FIG. 2, one example of primary broadcast channel (PBCH) and secondary broadcast channel (SBCH) transmission and beam reference signal (200) from a cell of 5G wireless system is shown. For standalone mode of operation a default PBCH cycle and SBCH cycle which is frequency agnostic can be specified in 3GPP specifications. As an example the default PBCH cycle (210a, 210b, 210c so on and so forth) can be specified as 20 or 40 ms. Similarly a default SBCH cycle (215a, 215b, 215c so on and so forth) can be specified as 40 or 80 ms. The PBCH and SBCH transmission are subject to DL beam sweeping over plurality of DL coverage beams in order to reach UEs in entire cell coverage area. The offset (225a, 225b so on and so forth) between the PBCH and SBCH can either be default offset or indicated in the PBCH. The PBCH is blindly detected by the UE during each synchronization signal period (250). The DL beam sweeping period (220a, 220b, 220c so on and so forth) comprising the PBCH aligns with the start of the radio frame of the cell since the PBCH period includes the physical synchronization signals. During the DL beam sweeping period (220a, 220b, 220c, etc.) plurality of DL coverage beams (240a, 240b, 240c, . . . 240y, 240z) are transmitted consecutively in time in different directions to provide coverage to UEs in the area covered by sweeping the beams. The PBCH is transmitted during the synchronization signal period (250) which may or may not cover all the OFDM symbols within the Transmission Time Interval (TTI) of 5G RAT depending on the exact physical layer design.

The synchronization signal period (250) consists of a plurality of OFDM symbols of 5G RAT and cover the minimum bandwidth consisting of plurality of subcarriers of 5G RAT required for the transmission of at least the synchronization signal (251), beam index sequence (252), master information block (MIB) (253) and beam reference signals (BRS) (254). The synchronization signal (251) consists at least the primary synchronization signal (i.e PSS), the secondary synchronization signal (i.e SSS) and the beam index sequence (252). The PSS/SSS (251), beam index sequence (252) and MIB (253) are transmitted on a plurality of OFDM symbols and plurality of subcarriers during the PBCH period or synchronization signal period (250) subject to beam forming logic associated with DL beam index #1 (240a). The beam index sequence (252) indicates the DL beam index #1. In the next synchronization period (250) the PSS/SSS (251), beam index sequence (252) indicating the DL beam index #2 and MIB (253) are transmitted on plurality of OFDM symbols and plurality of subcarriers subject to beam forming logic associated with DL beam index #2 (240b). This is referred as DL beam sweeping on PBCH wherein the PSS/SSS (251), beam index sequence (252) indicating the DL beam index #M and MIB (253) are transmitted on plurality of OFDM symbols and plurality of subcarriers in the mth PBCH period or synchronization period (250) subject to beam forming logic associated with DL beam index #M (240z). On blindly decoding the PSS/SSS (251) and beam index sequence (252), the UE determines the Physical Cell Identity (PCI) or cell id and the timing compensation to be applied to determine the radio frame boundary of the cell transmitting the synchronization signal. The beam reference signals i.e BRS (254) are reference signals transmitted on plurality of OFDM symbols and plurality of subcarriers excluding the resources occupied by PSS/SSS (251) beam index sequence (252) and MIB (253). The resources used for transmitting the BRS (254) on DL beam index #m depend on the PCI of the cell and the DL beam index. The BRS (254) is transmitted during the synchronization period (250) subject to the corresponding beam forming logic associated with DL beam index #m. In FIG. 2 the first beam during the DL beam sweeping period is depicted DL beam index #1 and subsequent beams in time as DL beam index #2 so on and so forth. Such a depiction should not be considered as a limiting case because the starting beam can be any beam uniquely identified by the beam index sequence subject to maintaining the beam sequence and the number of beams same during the DL beam sweeping period. For eg. the starting beam can be DL beam index #11 followed by DL beam index #12 while keeping the number of beams during the DL beam sweeping period equal to M.

After decoding the PSS/SSS (251) and beam index sequence (252); UE come to know the PCI and the DL beam index; hence the resources where it can perform measurements at physical layer on BRS. These measurements indicate the estimate of signal strength of beam index #m and reported to higher layer for cell mobility evaluations. Generically these measurements are termed as BRS Reference Signal Received Power (BRS_RSRP) and BRS Reference Signal Received Quality (BRS_RSRQ) providing an estimate of signal strength on received beam from the cell detected by the UE. For standalone mode of operation where the UE needs to camp on the cell of 5G RAT, the measurements on BRS i.e BRS_RSRP/BRS_RSRQ are used for idle mode mobility during cell selection and/or cell re-selection. Before camping on the cell of 5G RAT, UE blindly decodes the MIB (253) which contains at least: the DL system bandwidth. System Frame Number (SFN), Probing configuration, ePDCCH configuration, SBCH offset. In an embodiment of the present disclosure, the probing configuration and ePDCCH configuration is broadcasted in PBCH wherein the probing configuration comprises at least: one or more root sequences, DMRS reference power, probe offset, probe preamble group, and one or more probing resource configuration.

On blindly decoding the PBCH the UE determines the radio frame boundary, PCI, SFN, DL system bandwidth, best DL beam index, BRS resources for measurements, SBCH offset and probing configuration. Since the SFN and best DL beam index is determined and the SBCH cycle (215) and SBCH Offset (225) is known the UE can decode the SBCH on the determined best DL beam index to acquire further parameters concerning camping and cell access. The SBCH is decoded by the UE during the SBCH period (260). The DL beam sweeping period (230a, 230b so on and so forth) comprising the SBCH contains the parameters for cell camping and cell access and optionally BRS. During the DL beam sweeping period (230a, 230b etc.) plurality of DL coverage beams (245a, 245b, 245c, . . . 245y, 245z) are transmitted consecutively in time in different directions to provide coverage to UEs in the area covered by sweeping the beams. The SBCH is transmitted during the SBCH period (260) which may or may not cover all the OFDM symbols within the transmission time interval (TTI) of 5G RAT. The SBCH may be addressed on the ePDCCH by the SI-RNTI. The SBCH period (260) consist of plurality of OFDM symbols and plurality of subcarriers of 5G such that the SBCH burst (261) may occur in the minimum bandwidth or some other frequency resources of the entire DL system bandwidth. The SBCH period consists of at least the system information block (SIB) (261) and optionally the beam reference signals (BRS) (262). The SIB (261) contains at least: the primary PLMN, a plurality of system configuration index (SCI), tracking area code (TAC), parameters for access control barring (ACB).

The requirement to limit broadcast information size in 5G wireless system employing beamforming can be made possible if a large majority of parameters is not directly visible on broadcast but only "hidden" under a System Configuration Index or system configuration identifier (SCI). In an embodiment of the present disclosure, the system configuration index (SCI) is an index/identifier which is associated with a set of system information parameters and corresponding parameter values which are provided by the network on UE sending the probe or request. In standalone mode of operation of the 5G wireless system the MIB and SCI is required to provide at least system information to enable the UE to perform initial random access on the camped cell and send a connection request and receive connection response. Furthermore, upon knowing the meaning of SCI it should provide sufficient information so that IDLE mode UEs knows whether they are applying the correct mobility configuration. In the present disclosure the system information provisioned on UE demand or UE request is referred as "Other system information". Network may provide the "Other system information" to UE via dedicated signaling or through broadcast. For certain system information, it might be more efficient to provide the information by broadcast (e.g. ETWS, CMAS) since many UEs have to obtain the information. Based on these assumptions, referring to the LTE MIB/SIBs listed in Table 1 it can be determined whether the concerning system information parameter in the MIB/SIB is relevant to be hidden/referred/covered by the SCI. First it need to be examined from all broadcast parameters in the LTE MIB/SIB whether the parameter would be relevant for 5G (next generation wireless system), and if it is determined it is relevant then to determine whether the parameter can be provided either in the MIB on the PBCH or can be hidden/referred/covered by the SCI. On further analysis of Table 1, it seems good to exclude SIBs 9, 10, 11, 12 to be hidden/covered/referred by SCI since this information can be provided to UE with dedicated signaling after initial random access in 5G RAT. It may also seem reasonable to exclude SIBs 13, 15 since MBMS might not be provided by 5G RAT in the first phase. So, SIBs 13, 15 can be provided to UE with dedicated signaling if MBMS is intended to be provided by 5G RAT. Therefore it seems reasonable to focus the analysis on essential SIBs: i.e access related MIB/SIBs (MIB, SIBs 1, 2, 14 and mobility related SIBs 3, 4, 5, 6, 7, 8 to determine which parameter is relevant for 5G RAT and then determine whether it can be broadcasted separately because the parameter changes dynamically or it can be hidden/covered/referred by SCI. A number of broadcast parameters seem not so suitable to be hidden/referred/covered by SCI. This is especially true for parameters where the values of these parameters will potentially change dynamically. This concerns e.g. SFN, TAC, Cell identifier, DL coverage Beam index, access control parameters etc. These parameters are therefore not covered by SCI but broadcasted separately in PBCH/SBCH in addition to a plurality of SCI. Further, the PLMN identity would be needed by the UE to decide whether to camp on a cell if it meets the cell selection criterion and then start the probing procedure on the camped cell to request the other system information. However, if the PLMN identity is covered by the SCI then the UE does not whether the cell meeting the cell selection criterion belongs to the UE's primary PLMN. Therefore the primary PLMN should not be covered by SCI but broadcasted separately in PBCH/SBCH in addition to SCI. Another reason to probably keep these parameters outside the SCI space is that inclusion would potentially "explode" the SCI space. Large number of parameters could potentially be handled by a plurality of SCI. Assuming that the range of actual used values of the parameters is lower than the range of values defined in the standard, this could significantly reduce the broadcast message size. Further referring to Table 1, apart from the whitelist and blacklist that exist in SIB3, SIB4 and SIB5 none of the parameters therein seem location specific, so can be hidden/covered/referred by the SCI. In SIB6 and SIB7 there is no whitelist signaled so as a result none of the information in SIB6 seems location specific, so can be hidden/covered/referred by the SCI. In SIB8 the neighbor cell lists may have same problem as whitelist in SIB4 and the barring parameters in SIB8 might require special handling due to frequent update and hence can be excluded to be hidden/covered/referred by SCI. Table 2 is high level summary of which system information parameters can be hidden/covered/referred by SCI.

TABLE 2

| MIB/SIB | Main purpose | Covered by a plurality of SCIs | Remarks |
|---|---|---|---|
| MIB | Cell access | No | Dynamic parameters of MIB are broadcasted periodically |
| SIB1 | Cell access allowed | Yes (at least partly) | SCI needs to provide relevant Cell Access information |
| SIB2 | Radio Resource Config | Yes (at least partly) | SCI needs to provide relevant radio resources configuration for cell access. |
| SIB3 | Cell reselection | Yes (at least partly) | IDLE mode UE needs to know what radio resource configuration to use |
| SIB4 | Cell reselection intra-freq | Yes (at least partly) | Depending on support e.g. cell/TP specific offsets in 5G. Cell specific offsets (or beam specific offsets) would concern very localised information and probably not so easy to cover by SCI |

TABLE 2-continued

| MIB/SIB | Main purpose | Covered by a plurality of SCIs | Remarks |
|---|---|---|---|
| SIB5 | Cell reselection inter-freq | Yes (at least partly) | IDLE mode UE needs to know whether in the 5G area it is, any stored inter-freq reselection information is still valid. |
| SIB6 | Inter-RAT reselection UMTS | May be Yes (at least partly) | IDLE mode UE needs to know whether in the 5G area it is, any stored inter-RAT reselection information is still valid. Depends on 5G ← → 3G mobility need to be supported |
| SIB7 | Inter-RAT reselection GERAN | May be Yes (at least partly) | IDLE mode UE needs to know whether in the 5G area it is, any stored GERAN reselection information is still valid. Depends on 5G ←→ 2G mobility need to be supported |
| SIB8 | Inter-RAT reselection CMDA2000 | May be Yes (at least partly) | IDLE mode UE needs to know whether in the 5G area it is, any stored CDMA2000 reselection information is still valid. Depends on 5G ←→ CDMA mobility need to be supported |
| SIB9 | Home eNB name | No | Can be provided with dedicated signalling/or introduce broadcast signalling in stand-alone system |
| SIB10/SIB11/SIB12 | ETWS/CMAS | No | |
| SIB13/SIB15 | MBSFN/MBMS SAI list | No | No MBSFN on 5G cells |
| SIB14 | EAB | Yes | Relevant to know whether RACK is allowed |
| SIB16 | GPS/UTC time | No | Not essential even in LTE |
| SIB17 | WLAN | No | No if it can be assumed that these parameters can always be provided with dedicated signalling. |
| SIB18 | D2D Communication | Yes | Will need to be covered if D2D communication in IDLE mode is to be supported, and the UE needs to know what parameters to use in this location. |
| SIB19 | D2D discovery | Yes | |

On decoding the PBCH/SBCH the UE determines the primary PLMN, TAC, ACB parameters and SCI value; however, the UE does not know what the SCI value refers to. On decoding the PSS/SSS, beam index sequence and acquiring the contents of the MIB and SIB, the UE can perform BRS_RSRP/BRS_RSRQ measurements and can camp on a cell of the 5G RAT based on some cell selection criterion. On simple example of cell selection criterion is determining whether the detected cell belongs to primary PLMN of the UE and then comparing the BRS_RSRP/BRS_RSRQ measurement derived from one or more coverage beam measurements with a threshold either pre-defined in specification or indicated in SIB to check if the measurement is above the threshold to decide camping on the detected cell. In an embodiment of the present disclosure, a plurality of system configuration index may be broadcasted in SBCH; wherein the system configuration index (SCI) is a value which refers to set of parameters concerning system configuration and the corresponding parameter values which are provided by the network on UE sending the probe or request. In another embodiment of the present disclosure, a plurality of system configuration index may be broadcasted in PBCH; wherein the system configuration index (SCI) is a value which refers to set of parameters concerning system configuration and the corresponding parameter values which are provided by the network on UE sending the probe or request. The SCI value refers not only to the set of system configuration parameters but also to the values of those parameters. In an embodiment of the present disclosure, the UE is required to perform the probing procedure in order to find out the meaning of SCI value or what the SCI value refers to. In an embodiment of the present disclosure, the idle mode mobility of UE supporting 5G RAT is based on BRS measurements which represent the cell quality metric derived from one or more coverage beam measurements. FIG. 2 is just an example of PBCH and SBCH transmission and should not be considered as limiting case. It may be possible that the PBCH period comprises PSS/SSS, beam index sequence and a burst comprising the contents of MIB and SIB. In another alternative it is possible the PBCH period comprises the PSS/SSS and beam index sequence while the SBCH period comprises the contents of MIB and SIB.

In the non-standalone mode of operation of the 5G system the synchronization signal cycle, the length of DL beam sweeping period, the synchronization signal period, the bandwidth of the synchronization signal and the number of DL fixed beams transmitted during the DL beam sweeping period is provided to the UE from the PCell served by the LTE MeNB. In the standalone mode of operation of the 5G system the synchronization signal cycle, the length of DL beam sweeping period, the synchronization signal period, the bandwidth of the synchronization signal and the number of DL fixed beams transmitted during the DL beam sweeping period is pre-defined in the standard specification.

Figure 3A:
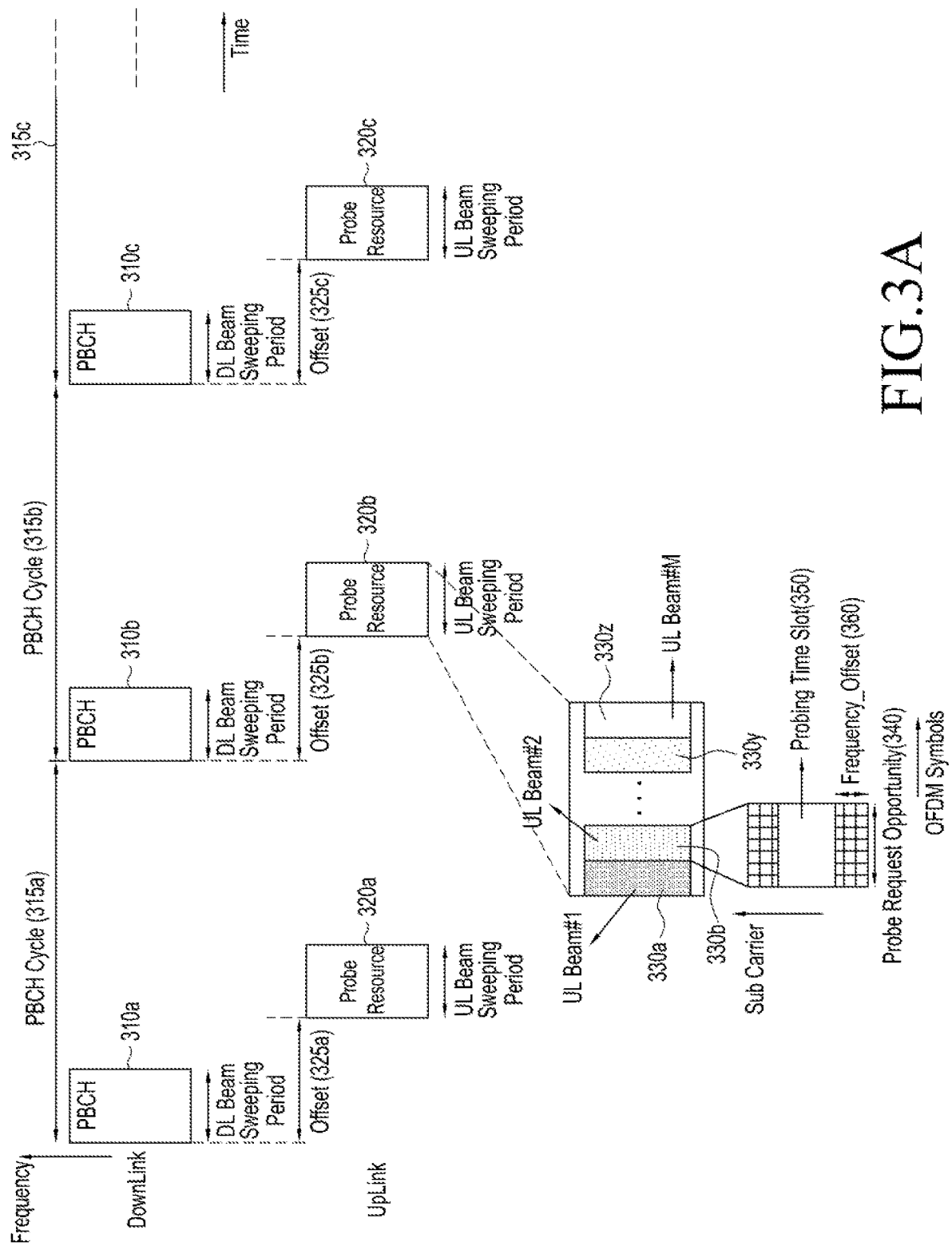
FIGS. 3A and 3B are an illustration of one example of a probe resource provided to a UE for transmitting probe request on a cell of 5G wireless system according to one embodiment of the present disclosure.
Figure 3B:
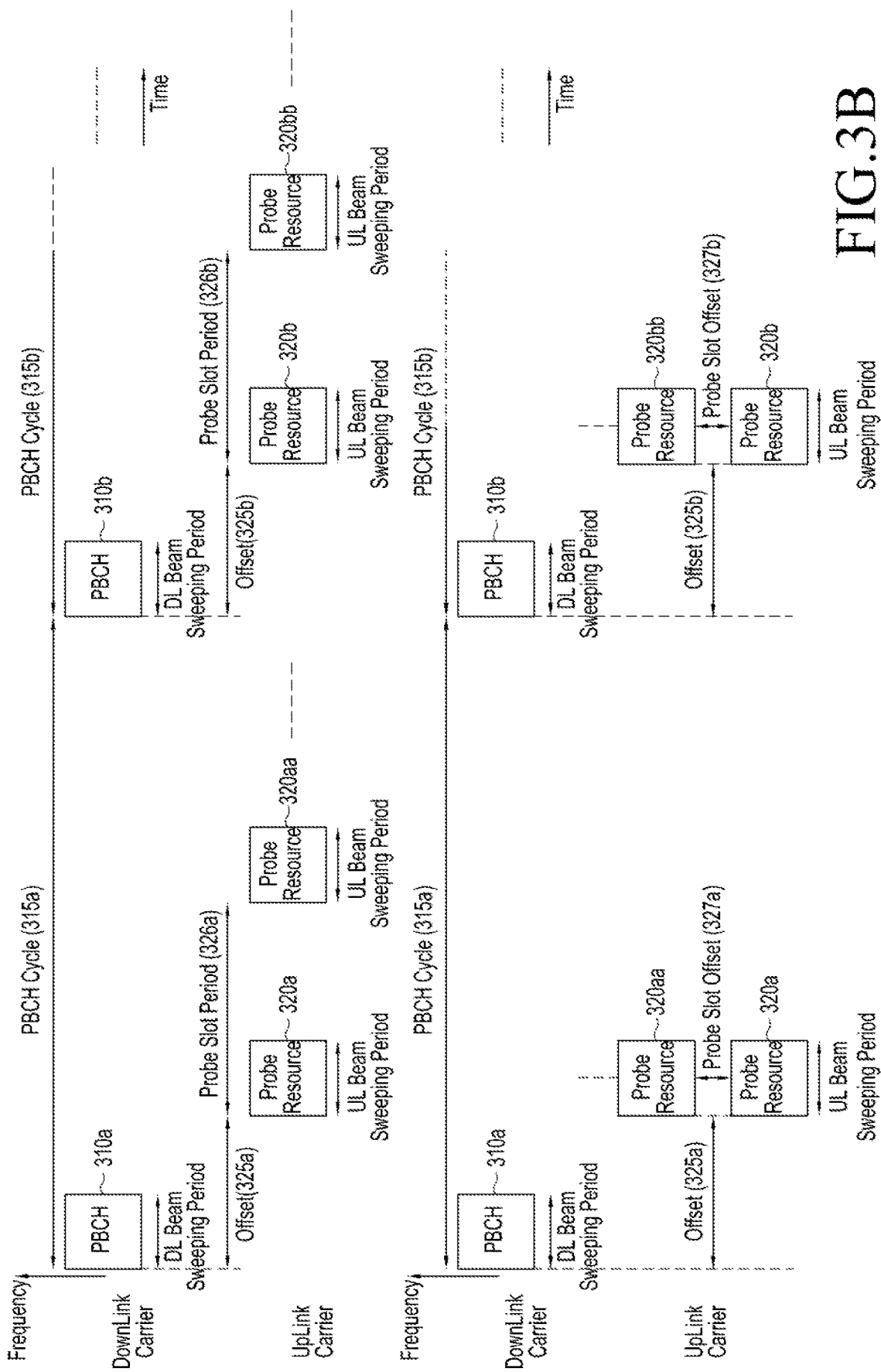

FIGS. 3A and 3B are an illustration of one example of a probe resource provided to a UE for transmitting probe request on a cell of wireless system according to one embodiment of the present disclosure.

FIG. 3A is an illustration of one example of probe resources provided to a UE (300a) for transmitting a probe request on a cell of wireless system where every instance of the probing opportunity is associated with PBCH period. The PBCH is transmitted periodically with a PBCH cycle (315) eg. 20 or 40 ms and the PBCH transmission is subject to DL beam sweeping over a plurality of DL coverage beams during the PBCH period (310). The probe offset (325*a*, 325*b* so on and so forth) between the PBCH period (310) and probe resource (320) can either be default offset or indicated in the probing configuration signaled in the PBCH. After camping on the cell of 5G RAT in order to know the meaning of system configuration index (SCI) acquired from SBCH/PBCH; the UE applies the probe offset (325) with respect to start of DL beam sweeping period (310) to initiate probing procedure based on the probing configuration signaled in the PBCH. Some parameters concerning the probing procedure which are static can be pre-defined or pre-configured in the standard specification and there is no need to provide such parameters in the probing configuration signaled to the UE in the PBCH. Examples of such parameters are the probe offset, probe power ramping step, probing time slot, probe bandwidth, probe response window size, maximum number of probe transmission attempts etc. The probe request can be either based on preamble transmission or based on simple ON/OFF physical layer signal transmission. The probe request transmitted on the probe resource (320) can be subject to either UL beam sweeping or repetition. In a TDD based 5G wireless system after UE determines the best DL beam index, based on channel reciprocity the UE may transmit the probe signal in the UL direction based on the best DL direction. In order the probe signal is received by the eNB, the UE may repeat the probe signal several times on the probe resource (320). Alternatively, the UE may apply UL beam sweeping on the probe signal while transmitting on the probe resource (320). During the UL beam sweeping period (320*a*, 320*b*, 320*c*, etc.) the probe signal is transmitted with same power on plurality of UL beams (330*a*, 330*b*, 330*c*, . . . 330*y*, 330*z*) consecutively in time in different UL direction towards the 5G eNB or the probe signal is simply repeatedly transmitted with same power during the probe repetition period (320*a*, 320*b*, 320*c*, etc) on each probe request opportunity (340). The length of the probing time slot (350) and the probe bandwidth (550) are static parameters and can be pre-defined or pre-configured in the standard specification. Alternatively, these parameters can be signaled in the probing configuration in the PBCH/SBCH. The starting resource block of the probe time slot is determined based on the frequency offset (360) with reference to lowest index resource block. In an embodiment of the present disclosure, the pre-configured or pre-defined parameters for probing includes at least the probe offset, probe power ramping step, probing time slot, probe bandwidth, frequency offset with respect to lowest indexed resource block of UL bandwidth, probe repetition period, probe response window size, maximum number of probe transmission attempts.

FIG. 3B is an illustration of another example of probe resources provided to UE (300*b*) either in time domain and/or frequency domain for transmitting a probe request on a cell of wireless system where each instance of the probing opportunity is associated with UE capability and DL beam index. The PBCH is transmitted periodically with a PBCH cycle (315) eg. 20 or 40 ms and the PBCH transmission is subject to DL beam sweeping over plurality of DL coverage beams during the PBCH period (310). The probe offset (325*a*, 325*b* so on and so forth) between the PBCH period (310) and probe resource (320) can either be default offset or indicated in the probing configuration signaled in the PBCH. When the probe request is based on simple ON/OFF physical layer signal then the probe request is transmitted on plurality of probe resources associated with the UE capability. Such probe resources are distributed either in time domain and/or frequency domain. The time domain probe resource (320*a*) may be associated with eMBB capable UE while the probe resource (320*aa*) may be associated with m-MTC capable UE so on and so forth. These time domain distributed probe resources (320*a*) and (320*aa*) are differentiated in time domain with the parameter probe slot period (326). Similarly, the frequency domain probe resource (320*a*) may be associated with DL beam index #1 while the probe resource (320*aa*) may be associated with DL beam index #2 so on and so forth. The frequency domain distributed probe resources (320*a*) and (320*aa*) are differentiated in frequency domain with the parameter probe slot offset (327). Therefore, each probe resource in time and frequency is associated with UE capability and DL beam index. Such a matrix of mapping probe resources to UE capability and DL beam index is shown in Table 6. The parameters probe offset, probe slot period, probe slot offset, probe resource id matrix can be provided in the probing configuration signaled to the UE in the PBCH. In an embodiment of the present disclosure, the probing configuration includes at least the probe offset, the length of probe time slot, the probe bandwidth, the probe frequency Offset with respect to lowest indexed resource block of UL bandwidth, the probe repetition period or UL beam sweeping period, the number of UL fixed beam, the periodicity of probe opportunity, power ramping step-size, timers used during probing procedure. In another embodiment of the present disclosure, UE may be provided with other information like mapping between the set of probe preambles and the UE basic capability, mapping between a subset of probe preambles and DL coverage beams, probe slot period and probe slot offset if a plurality of probe opportunities are configured in time and/or frequency domain respectively. An example of a plurality of probe opportunities associated with UE capability configured in time and/or frequency domain is depicted in FIG. 3B.

Figure 4:
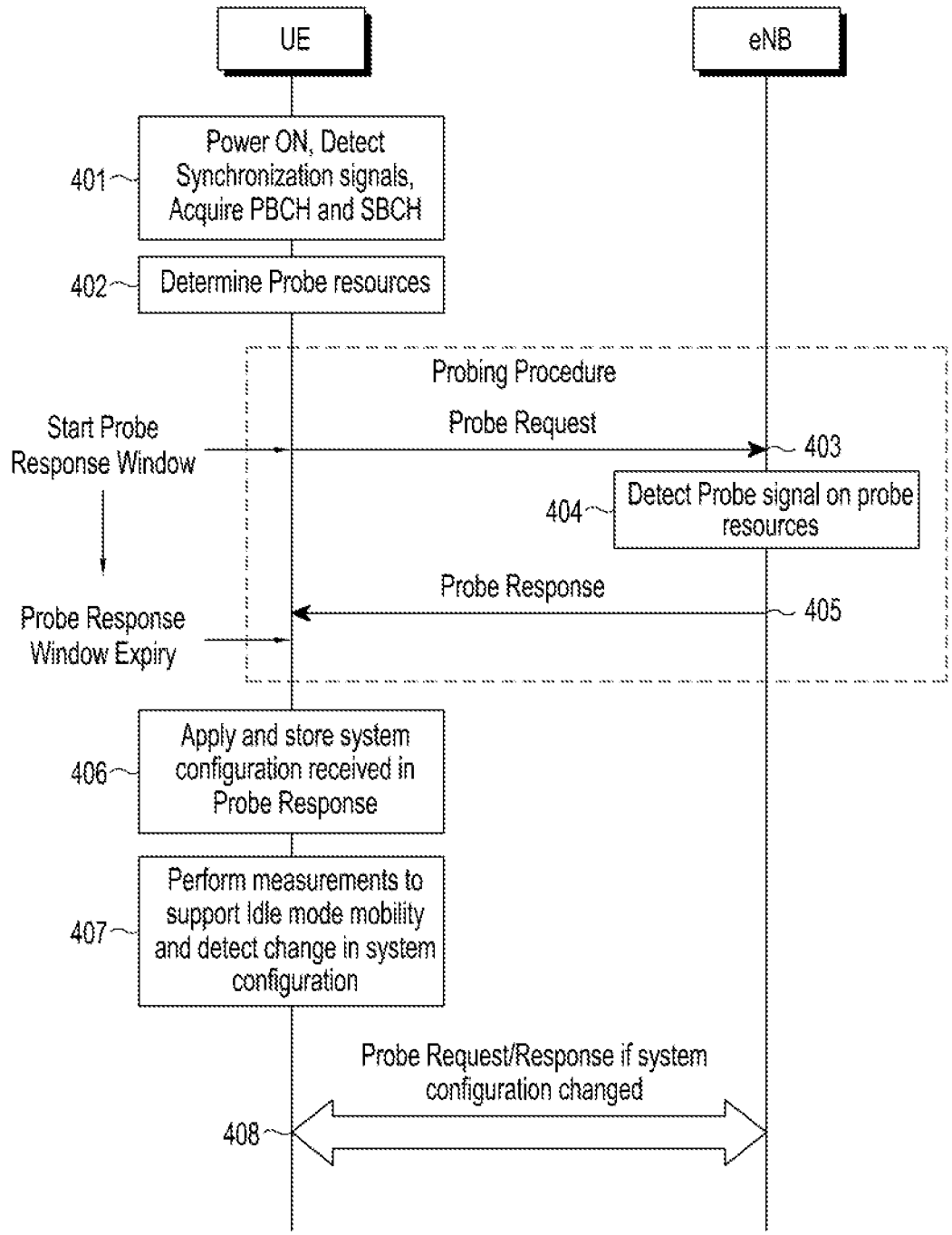
FIG. 4 is an illustration of generalized probe request and probe response procedure to acquire system information initiated by a UE when powered on and remaining in an idle mode according to one embodiment of the present disclosure.

FIG. 4 is an illustration of generalized probe request and probe response procedure to acquire system information initiated by a UE when powered on and remaining in an idle mode according to one embodiment of the present disclosure.

Referring to FIG. 4, at step 401 the UE supporting 5G RAT is powered ON and the UE starts searching for a synchronization signal on the frequency supported by the UE RF capability. The UE periodically searches the minimum bandwidth on the concerned carrier frequency to decode the synchronization signal and subsequently acquire the MIB from the PBCH. On blindly decoding the PSS/SSS, beam index sequence and acquiring the contents of the MIB i.e. PBCH and subsequently SIB i.e. SBCH, the UE performs BRS_RSRP/BRS_RSRQ measurements on one or more coverage beams. The UE decides to camp on a cell of the 5G RAT based on some cell selection criterion and the PLMN selection rule. The UE acquires a plurality of SCI value(s) from the PBCH/SBCH but does not know the meaning of the SCI value(s).

At step 402 the UE determines the probe resources based on the pre-configured parameters or parameters signaled in PBCH/SBCH.

At step 403, on the determined probe resource on the UL carrier frequency the UE initiates the transmission of the probe request according to probing configuration received in PBCH. The probe signal is transmitted by the UE with transmission power set according to the estimate of the DL pathloss calculated from the received power measurement eg. BRS_RSRP on best DL beam determined. The probe signal is transmitted with same power on a plurality of UL beams consecutively in time in different UL direction towards the eNB during the UL beam sweeping period or the probe signal is simply repeatedly transmitted with same power during the probe repetition period on each probe time slot. The UE starts the probe response window timer expecting the response from the eNB.

At step 404, one or more TPs (i.e. reception points) belonging to one or more eNBs detect a probe signal on the probe resource. On detecting the probe signal one or more TPs belonging to one or more eNBs determine that there is a UE in its cell coverage area who has acquired SCI wants to the know the meaning of SCI.

At step 405, one or more TPs belonging to one or more eNBs transmit the probe response which includes the system information (i.e. L1/L2 configuration or system information blocks) corresponding to a plurality of SCI values which the responding nodes are transmitting in the PBCH or/and SBCH. The probe response message can be addressed by probing-radio network temporary Identifier (Pr-RNTI) in the beam specific search space to UE on the DL coverage beam identified by the DL beam index. If the responding node does not know the best DL beam index for the UE requesting probe response, then the probe response message may be subject to DL beam sweeping. Alternatively, if the responding node knows the best DL beam index for the UE requesting probe response, then the probe response message can be addressed by the probing radio network temporary identifier (Pr-RNTI) in the beam specific search space to the UE only on the DL coverage beam identified as best DL beam index. It is also possible to repeat the probe response message on the DL coverage beam identified as best DL beam index for the requesting UE. Upon expiry of the probe response window if the UE who transmitted probe signal at step 403 did not receive the probe response then the UE can re-transmit the probe request with increased power compared to the previous probe signal transmission power wherein, the power increase is determined by the probe power ramping step which is either a pre-configured parameter or broadcasted to the UE in PBCH/SBCH. The UE is allowed to perform re-transmission of probe request for certain number of attempts if the previous attempts resulted in no probe response from the eNB. Such maximum number of probe request attempts is governed by the parameter maximum number of probe transmission which is either a pre-configured parameter or broadcasted to the UE in PBCH/SBCH. The probing procedure depicted in steps 403-405 can be either two step procedure or four step procedure. The details of two step probing procedure and 4 step procedure are described in FIGS. 7, 8, 9 and 10.

At step 406, upon reception of the probe response the UE knows the system information (i.e. L1/L2 configuration or system information blocks) related to each of the SCI value it acquired from PBCH/SBCH. The UE applies and stores a set of system information parameters and the parameter values received in the probe response and tags the system information parameter values with the associated SCI value(s). The probe response may comprise set of system information parameters and corresponding parameter values associated with SCI other than the SCI broadcasted by the camped cell. If the UE identifies set of system information parameter values for SCI other than the SCI acquired from camped cell the UE stores the configuration parameters as a configuration list associated with the corresponding SCI.

At step 407 after applying the configuration the UE is able to perform neighbor cell measurements to support an idle mode mobility. If the UE continues to stay in idle mode then the UE keeps tracking the DL coverage beams for BRS_RSRP/BRS_RSRQ measurements of camped cell as well as neighbor cell. Based on the cell re-selection criterion the UE performs the idle mode mobility based on BRS measurements. During idle mode mobility if the UE acquires a new SCI value from the PBCH/SBCH transmitted on a DL coverage beam and the UE does not know the meaning of the new SCI value then the UE needs to perform the probing procedure at step 408 if SCI value change is detected. If the UE detects that the configuration associated with new SCI value is available in stored system information then there is no need to perform the probing procedure. It is possible that some SCI value(s) may change within the coverage of the camped cell indicating that different L1/L2 configuration is applied within the same cell coverage area. Traditionally, L1/L2 configuration is cell-specific so the SCI value change may occur when the UE performs cell re-selection. It may also be possible that a cluster of cells may have the same SCI value meaning same L1/L2 configuration. The various steps mentioned in FIG. 4 illustrates the generalized probing procedure on the cell of 5G RAT on which the UE has camped; therefore either some of the steps can be combined, sequence of some steps can be modified or some steps can be omitted without deviating from the spirit of the illustrated procedure. The system information provided to the UE in the probe response or any other message during the probing procedure is called System Information Table (SIT) which specifies all parameter values that the range of SCI refers to. For example typical broadcast information could easily cover 100 parameters or more. Assuming the wireless operator want to be able to use only one specific value for 99 of these parameters, and a range of 20 values for the 100th parameter then the range of SCI values would be 20. Then it would be quite "stupid" to include in the SIT a full set of 100 parameters repeating twenty times, of which 99 parameters would be identical and only one parameter would have a different value. A smarter mechanism might be based on what could be called "multiplication encoding". E.g. assume the system information consists of 5 parameters:

ParamA: Has 10 values in standard, but operator only wants to use 2 values: {a0, a1}

ParamB: Has 10 values in standard, but operator only wants to use 1 value: {b0}

ParamC: Has 10 values in standard, and operator wants to use all: {c0, c1, . . . c9}

ParamD: Has 10 values in standard, but operator only wants to use 2 values: {d0, d1}

ParamE: Has 10 values in standard, but operator only wants to use 2 values: {e0, e1}

Let's assume the operator wants to be able to use any combination of parameter values it intends to use in broadcast. Then the SCI could be computed as follows:

$$SCI = \#valuenumberParamA*(\#valuesParamB* \#valuesParamC*\#valuesParamD*\#valuesParamE)+$$

$$\#valuenumberParamB*(\#valuesParamC*\#valuesParamD*\#valuesParamE)+$$

$$\#valuenumberParamC*(\#valuesParamD*\#valuesParamE)+$$

$$\#valuenumberParamD*(\#valuesParamE)+$$

$$\#valuenumberParamE$$

As an example, the SCI to indicate (a1,b0,c5,d0,e1) would be:

$$SCI = 1*(1*10*2*2) +$$
$$0*(10*2*2) +$$
$$5*(2*2) +$$
$$0*(2) +$$
$$1$$
$$= 40 + 0 + 20 + 0 + 1$$
$$= 61$$

With this type of encoding, the SIT would just consist of a list of the parameter values that the operator intends to use. I.e. in the example above, the SIT would indicate: {a0, a1}, {b0}, {c0, . . . c9}, {d0, d1}, {e0, e1} as shown in Table 3 thus defining 80 SCI values.

TABLE 3

System Information Table

Parameter A: {a0, a1}
Parameter B: {b0}
Parameter C: {c0, c1, . . . c9}
Parameter D: {d0, d1}
Parameter E: {e0, e1}

Potential drawbacks of the SCI encoding approach shown above are as follows:

1) Only works if an SCI value is required for each combination of parameter values. For e.g. does not result in optimal encoding if d0 is only used in combination with e1 in the above example.

2) In case of extensions (additional parameters added by a certain future release of standard), all SCI values change. Then somehow it has to be ensured that legacy UE still understand the SCI meaning for the parameters that are relevant for them.

An alternative solution could be to use explicit signaling for L1/L2 configuration parameters (e.g. SCI #m: configuration of x, y, z . . . ; SCI #n: configuration of k, l, m . . . ) as shown in Table 4 below, and then use multiplication encoding for some quite independent parameters that are always valid and using a wide range of values. In such alternative solution, the SIT comprises multiple blocks of system information or multiple parts of system information. Each system information block or system information part is identified by a unique identifier so that UE can distinguish each system information block. For e.g. System Information Block X (SIB X), System Information Block Y (SIB Y), System Information Block Z (SIB Z) so on and so forth. There can be one or more configuration for each system information block/part wherein each configuration associated with a particular system information block/part is identified by a SCI. For e.g. System Information Block/Part X (SIB X) comprising parameter A, parameter B and parameter C has three configurations namely Config 1, Config 2 and Config 3 identified by SCI #1, SCI #2 and SC 1 #3 respectively. Each configuration of SIB X takes different combination of values for parameters A, B and C. System Information Block/Part Y (SIB Y) comprising parameter D and parameter E also has three configurations namely Config 1, Config 2 and Config 3 identified by SCI #1, SCI #2 and SCI #3 respectively so on and so forth. Multiple configurations of each system information block/part representing different combination of parameter values along with the associated SCI are provided in the form of list. The list of configurations for the system information blocks/parts is generically referred as System Information Table (SIT) in the present disclosure. The SIT is valid within the PLMN on which the UE has registered.

TABLE 4

System Information Table

SCI#m: {a1, b0, c5, d0, e1}
SCI#n: {a0, c5, d0, e1}
SCI#o: {b0, c0, d1, e1}
SCI#p: {. . . , . . . , . . . , . . . , . . . }
SCI#q: {. . . , . . . , . . . , . . . , . . . }
.
.
.
SCI#z: {a1, b0, c0, d1, e0}

Figure 5:
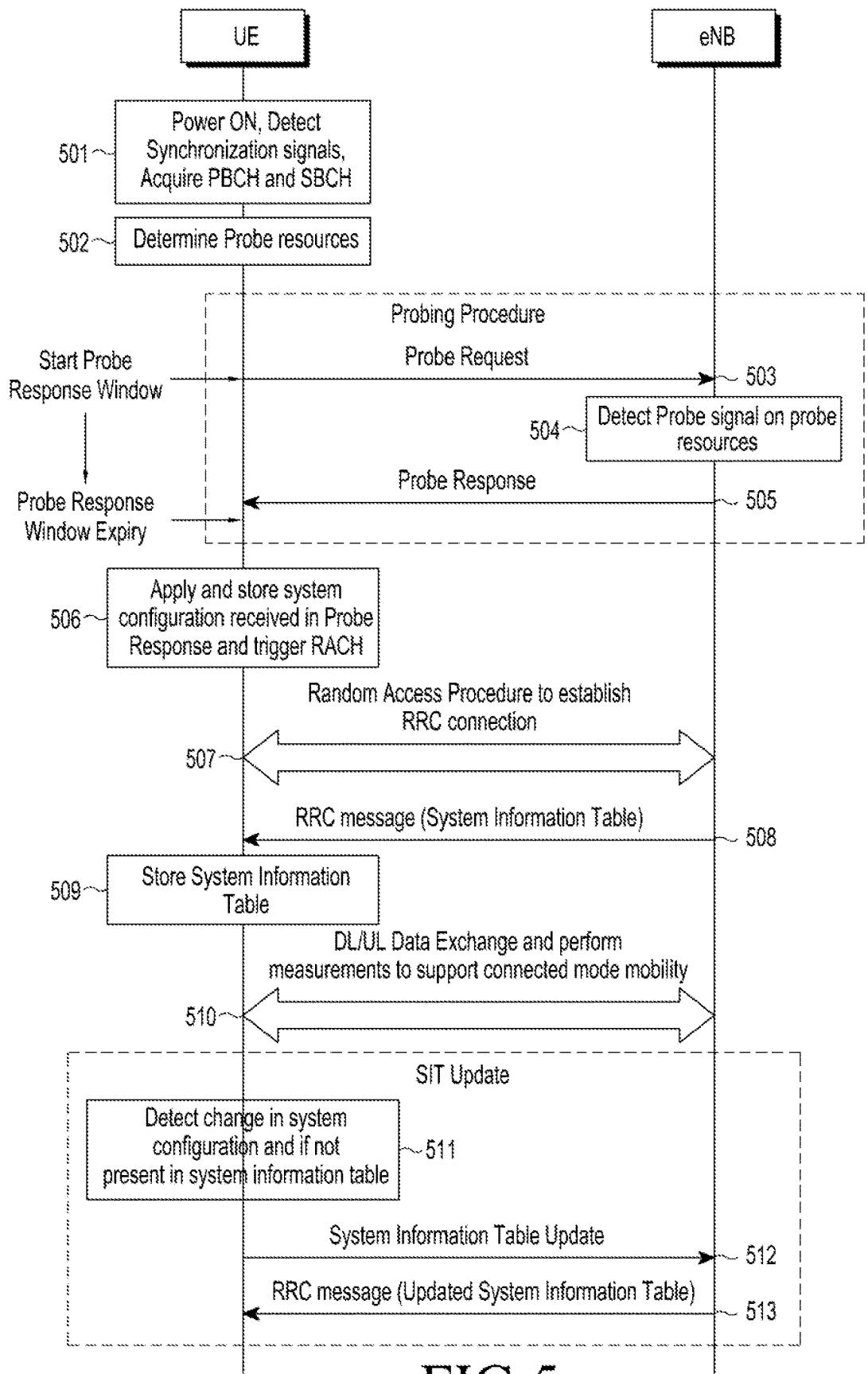
FIG. 5 is an illustration of generalized probe request and probe response procedure to acquire system information initiated by a UE when powered on and transitions to connected mode according to one embodiment of the present disclosure.

FIG. 5 is an illustration of generalized probe request and probe response procedure to acquire system information initiated by a UE when powered on and transitions to connected mode according to one embodiment of the present disclosure. All the steps from 501 to 506 are same as steps 401 to 406 of FIG. 4.

Referring to FIG. 5, at step 506 since the UE applied the configuration received in probe response so it can trigger the normal random access (RACH) procedure. All the parameters concerning the PRACH configuration are received in the probe response so at step 507 UE performs RACH procedure on the camped cell of 5G RAT to establish RRC connection to start DL/UL data exchange. The system information received in the probe response is sufficient to enable the UE to perform initial access and also support idle mode mobility. In addition, the UE is not aware of the system information which is not covered/referred by the SCI value for which probe response was provided to UE. One example of such configuration is the configuration required for supporting features like MBMS, device-to-device (D2D) communication, wireless LAN (WLAN) interworking which can be provided with dedicated signaling after the normal RACH procedure. However, the system information corresponding to other SCI values related to L1/L2 configuration applicable to coverage areas which are immediate neighbors of the cluster of TPs serving the UE is not known to the UE if not included in the probe response. Therefore, at step 508 after the UE successfully establishes the RRC connection, the eNB provides the UE additional system information in RRC message. This system information can be termed as system information table (SIT). The SIT has parameters and parameter values tagged with SCI values as shown in Table 3 or Table 4 which may be applicable to either the immediate neighbors of the cluster of TPs serving the UE. The SIT may be applicable to the entire coverage area of the operator network (i.e. PLMN) if a central node covers a very large coverage area controlling several hundreds to few thousands of TPs. The eNB can provide the SIT to the UE through dedicated RRC signaling either in one shot or through multiple installments of system information corresponding to associated a plurality of SCI value(s). It can be also possible to broadcast the SIT if the eNB detects large number of UEs performing probing procedure. In addition to encodings shown in Table 3 and Table 4, one general approach would be to use some form of delta signaling when the SIT is provided.

For example, eNB includes first SIT entry1 fully and for entry2 the SIT signaling only includes the delta compared to entry1, i.e. remove some fields/overwrite some fields. For entry3 the SIT signaling only includes the delta compared to entry2 so on and so forth. An alternative would be to indicate for each entry a reference SIT entry, and then signal the delta. In this case if the eNB knows the UE understands one SIT entry (e.g. the entry for the configuration provided in probe response, let's assume SCI=17), then the SIT update table provided in dedicated signaling might not need any full entry. For e.g. entry 24: Reference entry=17; Delta= . . . ; while entry 25: Reference entry=24; Delta= . . . and entry 26: Reference entry=17; Delta= . . .

At step 509, the UE stores the SIT in addition to the already received system configuration in probe response stored at step 506.

At step 510, the UE is in a position to start DL/UL data exchange with the serving cell and able to perform mobility measurements. The first level of UE mobility involves cell mobility where the serving cell of 5G RAT becomes weaker than a neighbor cell in which case a handover is needed. In the present disclosure, the measurement event configured for the UE for handling of cell level mobility of 5G RAT is based on RSRP/RSRQ measurements performed by the UE on beam-specific reference signals (BRS) transmitted on the DL coverage beams by cells in the coverage area. Such cell change procedure (i.e. handover) involves receiving RRC reconfiguration message containing the mobility information wherein, UE re-establishes the user plane protocol stack including at least the MAC, RLC and PDCP entity after successful random access on target cell. In such an event the UE re-establish the data radio bearers on the target cell to continue DL/UL data transfer. The second level of UE mobility is termed as beam level mobility wherein; the serving DL beam of the UE is switched or changed. Such beam level mobility is directly handled at the physical layer or MAC layer by the concerned serving cell of the 5G RAT serving the UE at that point of time. Such beam level mobility is transparent to the UE and based on the beam level measurement configuration provided to the UE after the UE successfully complete random access and establishes RRC connection or RRC re-establishment. In an embodiment of the present disclosure, the beam mobility measurement configuration includes the CSI-RS processes the UE should monitor to perform CSI measurements that includes at least CQI, RI, PMI, CSI-RS RSRP measurements on the CSI-RS resources configured for the UE. These CSI measurements are reported by the UE at physical layer directly or MAC layer to the concerned serving cell so that concerned cell takes beam mobility decisions.

At step 511 during cell level mobility or beam level mobility if the UE detects the SCI value has changed in comparison to current active SCI value then the UE checks the stored SIT for the new SCI value. If the new SCI value is not present in the stored SIT then the UE requests update of SIT at step 512. Based on UE request for SIT update eNB provides the UE with updated SIT at step 513.

Figure 6:
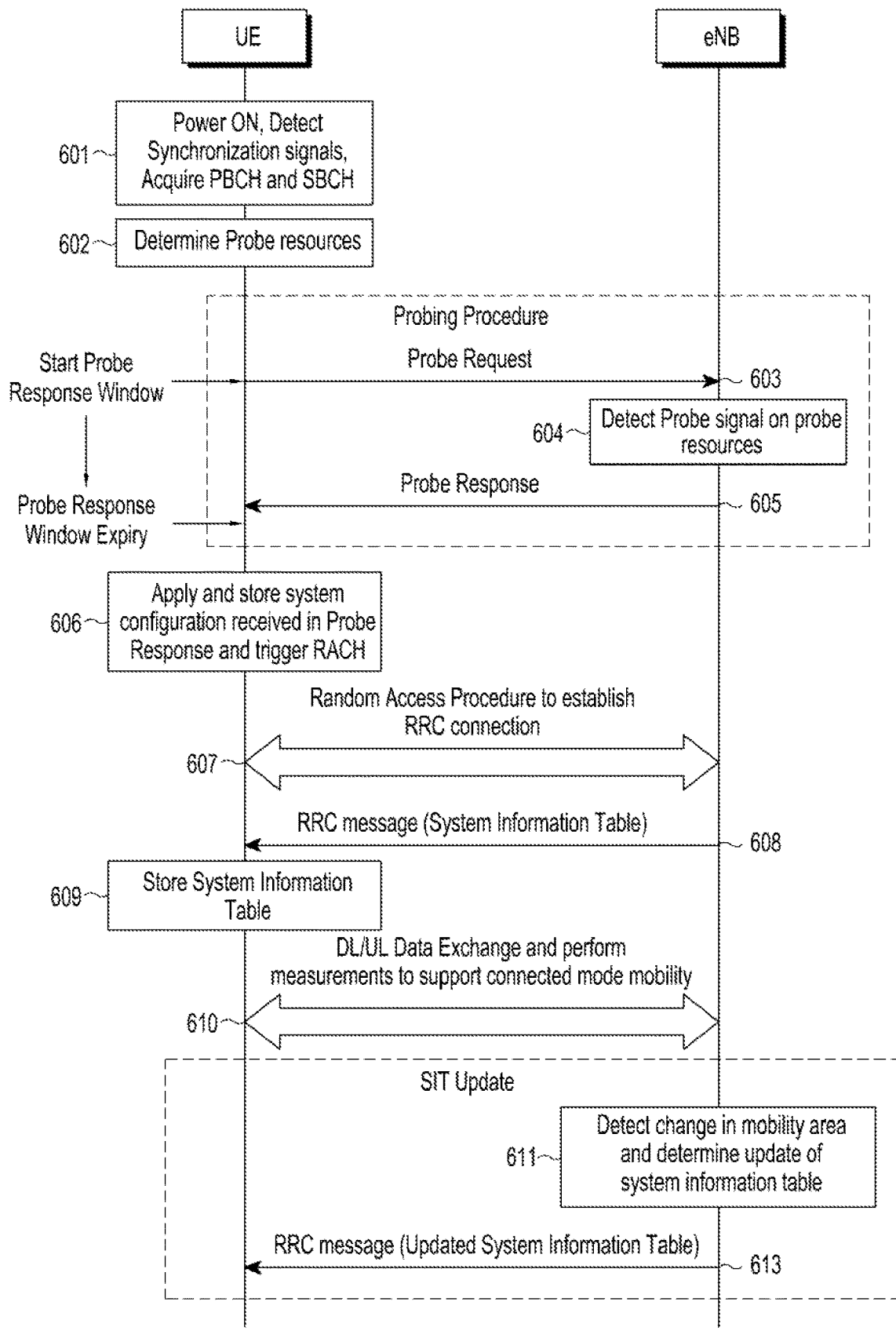
FIG. 6 is an illustration of generalized probe request and probe response procedure to acquire system information initiated by a UE when powered on and transitions to connected mode according to another embodiment of the present disclosure.

FIG. 6 is an illustration of generalized probe request and probe response procedure to acquire system information initiated by a UE when powered on and transitions to connected mode according to another embodiment of the present disclosure.

Alternatively, as shown in FIG. 6 at step 611 eNB detects the UE is going to move in a mobility area either during cell level mobility or beam level mobility where the UE does not have system information concerning the target mobility area. The eNB determines SIT update is needed for the UE and at step 613 the eNB provides SIT update to the UE in RRC message. On providing the SIT for the first time and when the UE in RRC connected mode moves; the network maintains UE context and has an idea what SIT entries are provided to UE. So, if the RRC connected UE is moving in an area for which it does not have entries then the network provides SIT update without UE request. The way today during X2 handover, UE context is maintained so similarly SIT context can be maintained by network to provide SIT update. Further on providing the SIT for the first time, when the UE receives the SIT it also receives a validity timer associated with the SIT. Upon expiry of the timer the SIT is considered invalid. If the UE performs power OFF and power ON after receiving the SIT and the SIT validity timer is running, there is no need for the UE to perform probing procedure. The validity timer is either applicable to all entries in the SIT or each entry has an associated validity timer. Typical value of SIT validity timer is 24 hours. UE may perform SIT update request if the SIT validity timer is about to expire. The detailed UE behavior when there is change in system information handling during idle mode and connected mode is described later in the present disclosure.

The various steps mentioned in FIGS. 5 and 6 illustrates the generalized probing procedure on the cell of 5G RAT on which the UE intends to establish RRC connection; therefore either some of the steps can be combined, sequence of some steps can be modified or some steps can be omitted without deviating from the spirit of the illustrated procedure.

Figure 7:
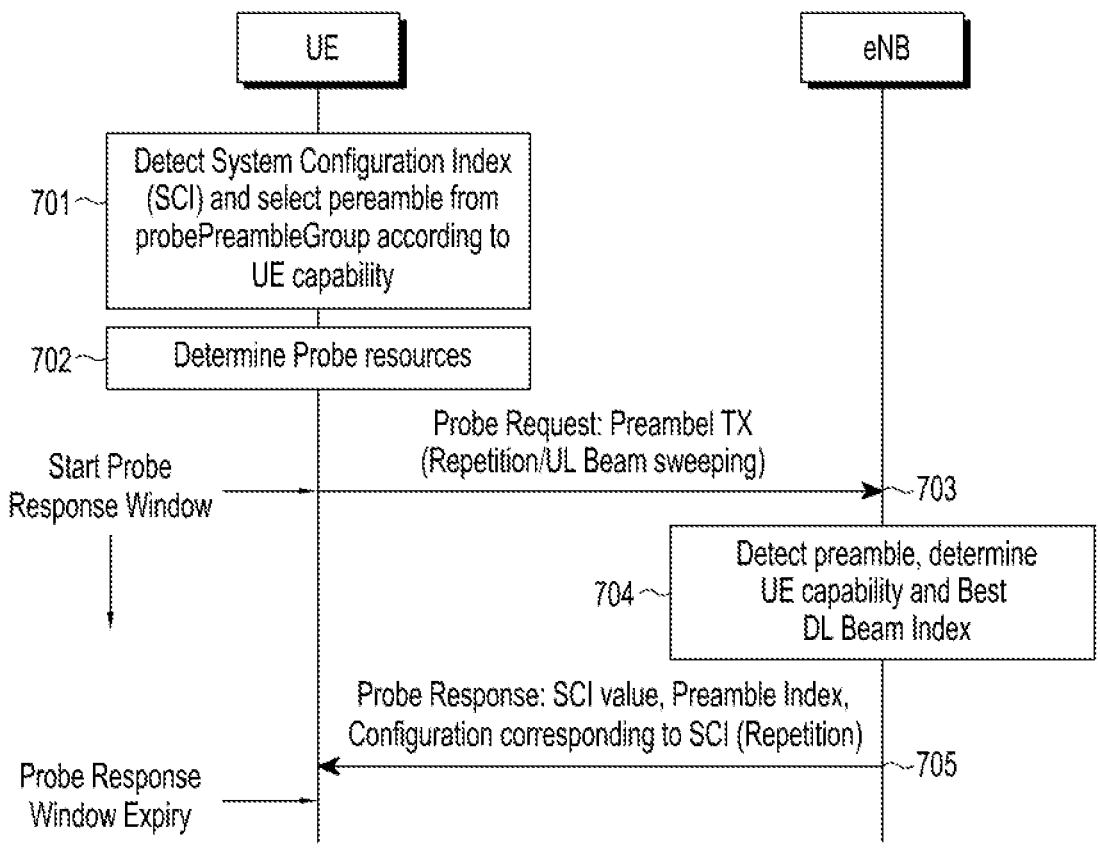
FIG. 7 is an illustration of two step probing procedure based on probe preamble transmission to acquire system information initiated by a UE when powered on according to one embodiment of the present disclosure.

FIG. 7 is an illustration of two step probing procedure (700) based on probe preamble transmission to acquire system information initiated by a UE when powered on according to one embodiment of the present disclosure.

Referring to FIG. 7, at step 701 the UE acquired the SCI from the PBCH/SBCH and determines to initiate probing procedure to understand the meaning of SCI. To initiate a probing procedure the UE needs to transmit the probe request on a probe resource configured in the UL. The probe signal is based on preamble transmission to indicate probe request. In an embodiment of the present disclosure, the probe signal is based on preamble transmission to indicate probe request. In the probing configuration received in the PBCH/SBCH a set of root sequences is provided based on which the UE derives plurality of preambles. This set of preamble can be used as probe signal to be transmitted on the probe resource to indicate probe request. This set of preamble can be further grouped in one or more mutually exclusive subset of preambles. Such grouping of preamble set is indicated with parameter probe preamble group sent in the probing configuration. The 5G wireless system is expected to address different use cases having quite different requirements in terms of data rate, latency, mobility etc. However, it is expected the design of the air-interface of 5G would be flexible to serve the UEs having quite different capabilities depending on the use case and market segment the UE cater service to the end customer. Therefore the 5G RAT operating on carrier frequency will be able to serve UEs having different UE capabilities. Such basic UE capability (i.e. eMBB UE, m-MTC UE, URLLC UE) can be mapped to the probe preamble group so that the UE chooses the probe preamble from the indicated subset and upon detection the eNB can determine the basic UE capability. In an embodiment of the present disclosure, there is one-to-one mapping between the set of probe preambles and the basic UE capability. This one-to-one mapping is either fixed in the standard specification or alternatively provided to the UE as part of the probing configuration indicated with parameter probe preamble group.

At step 702 the UE determines the probe resource for the transmission of probe preamble based on the probe offset starting from the start of the PBCH period (refer FIG. 3A). The probe offset can either be default offset or indicated in the probing configuration. The probe resource is basically a PRACH resource since a probe preamble will be transmitted on it as a probe signal. Therefore, the probe resource could also be used as PRACH resource for the transmission of normal RACH preamble. Therefore, from system point of view the probe resource has dual usage in terms of probing procedure as well as random access procedure.

At step 703 based on the determined best DL beam index the UE selects the probe preamble from the subset of preambles depending on UE capability. In an embodiment of the present disclosure, there is one-to-one mapping between the subset of probe preambles and the set of DL coverage beams. This one-to-one mapping is either fixed in the standard specification or alternatively provided to the UE as part of the probing configuration. The mapping of the probe preambles with UE capability and DL beam index can be expressed in the form of matrix as shown in Table 5 below which can be indicated with parameter probe preamble group.

TABLE 5

| Beam Index UE Capability | DL Beam#1 | DL Beam#2 | DL Beam#3 | ... | DL Beam#N |
|---|---|---|---|---|---|
| eMBB UE | Preamble#1 | Preamble#2 | Preamble#3 | ... | Preamble#L |
| MTC UE | Preamble#L + 1 | Preamble#L + 2 | Preamble#L + 3 | ... | Preamble#M |
| URLL UE | Preamble#M + 1 | Preamble#M + 2 | Preamble#M + 3 | ... | Preamble#N |

The UE transmits the selected probe preamble on the determined probe resource with a probe transmission power set according to the DL pathloss estimated from the received power measurement i.e. BRS_RSRP on best DL beam index.

At step 703, the UE transmits the selected probe preamble on the first probe opportunity within the probe repetition period or UL beam sweeping period with the same transmission power. In an embodiment of the present disclosure, the probe transmission power is set according to the DL pathloss estimated from the received power measurement on best DL beam index. In an embodiment of the present disclosure, the selected probe preamble is simply repeatedly transmitted or transmitted on different UL beams corresponding to the probe time slot with the same transmission power covering the probe repetition period or the UL beam sweeping period. On completion of transmission of probe request during the probe repetition period or the UL beam sweeping period, the UE starts the probe response window and starts monitoring the DL for reception of probe response.

At step 704, the eNB detects the transmitted probe preamble by the UE during the probe repetition period or UL beam sweeping period. Since the one-to-one mapping between the set of probe preambles and the basic UE capability is known to the eNB, the UE capability of the UE sending the probe request is determined by the eNB. Further the eNB is aware of the one-to-one mapping between the subset of probe preambles and the set of DL coverage beams, the best DL beam index is determined for the transmission of probe response message. It may be possible one or more TPs belonging to one or more eNBs to detect the probe preamble on the probe resource at step 704 because same set of root sequence is used in neighboring nodes to derive a plurality of probe preambles. On detecting the probe preamble one or more TPs belonging to one or more eNBs determine that there is a UE associated with a particular UE capability in its cell coverage area who has acquired SCI and wants to know the meaning of SCI.

At step 705, the eNB transmits on the cell served by the frequency the probe response message addressed by the Probe-radio network temporary identifier (Pr-RNTI) in the beam specific search space to UE on the DL coverage beam identified as best DL beam index. It may be possible at step 705, one or more TPs belonging to one or more eNBs to transmit the probe response which includes the system information (i.e. L1/L2 configuration) associated with the SCI value which the responding nodes transmitted in the PBCH/SBCH. This may result in unnecessary responses from neighboring nodes which detected the probe preamble in addition to the probe response from the desired eNB. For the reception of probe response message since the UE determined the best (strongest) DL beam index it would monitor the corresponding beam specific search space. In an embodiment of the present disclosure, the probe response message includes at least one or more SCI value(s), preamble index, system configuration associated with each SCI value and other configuration not covered/referred by the SCI value. In an embodiment of the present disclosure, the probe response message is addressed by the Pr-RNTI in the beam specific search space on the DL coverage beam identified as best DL beam index. The responding eNB may repeat the probe response on the best DL coverage beam determined at step 704. If the UE does not receive the probe response while the probe response timer is running then the UE re-transmit the selected probe preamble upon expiry of the timer.

However, the transmission power of the probe preamble is incremented by a power ramping step size. The UE is allowed to do such re-transmission of probe preamble for pre-configured number of times with power ramping of preamble transmission power during each re-transmission attempt.

The various steps mentioned in FIG. 7 illustrates the two step probing procedure on the cell of 5G RAT based on preamble transmission; therefore either some of the steps can be combined, sequence of some steps can be modified or some steps can be omitted without deviating from the spirit of the illustrated procedure.

Figure 8:
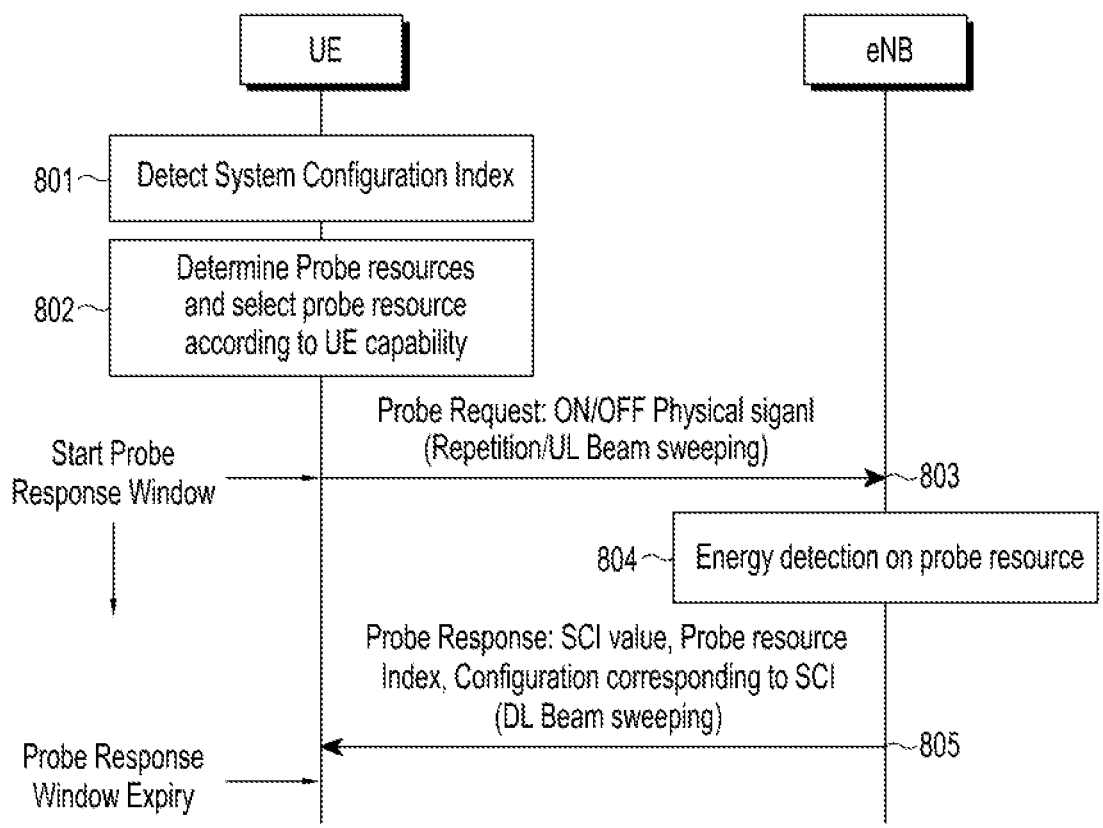
FIG. 8 is an illustration of two step probing procedure based on probe ON/OFF signal transmission to acquire system information initiated by a UE when powered on according to another embodiment of the present disclosure.

FIG. 8 is an illustration of two step probing procedure (800) based on probe ON/OFF signal transmission to acquire system information initiated by a UE when powered on according to another embodiment of the present disclosure.

Referring to FIG. 8, at step 801 UE acquired the SCI from the PBCH/SBCH and determine to initiate probing procedure to understand the meaning of SCI. To initiate probing procedure UE needs to transmit the probe request on a probe resource configured in the UL. The probe signal is based on an ON/OFF physical signal transmission to indicate probe request. One example of design of such an ON/OFF physical signal is similar to the scheduling request (SR) transmission in LTE. Since the same ON/OFF signal will be used by UEs of different UE capability (eg. eMBB UE, m-MTC UE, URLL UE etc) different probe resources need to be provided to differentiate the basic UE capability. A plurality of probe resources in time and/or frequency can be used to transmit the ON/OFF probe signal to indicate different UE capabilities (refer FIG. 3B). There is one-to-one mapping between the probe resource and the associated UE capability.

At step 802, the UE based on its UE capability determines the probe resource for the transmission of probe ON/OFF signal. The plurality of probe resources could be distributed either in time domain and/or frequency domain and may be referred by a probe resource identifier (refer FIG. 3B). Such mapping of probe resources and the parameters probe offset, probe slot period or probe slot offset are sent in the probing configuration. Using the parameter probe offset starting from the start of the PBCH period and the parameter probe slot period or probe slot offset (refer FIG. 3B) the UE determines the probe resource based on it UE capability. Further, it may be possible to map different DL beam index to the probe resources in time domain and/or frequency domain. The mapping of the probe resources with UE capability and DL beam index can be expressed in the form of matrix of probe resource identifiers (Probe RID) as shown in Table 6 below which can be indicated with parameter probe resource Group.

At step 804, the eNB detects the transmitted probe signal by the UE during the probe repetition period or UL beam sweeping period if the detected energy is above a certain threshold. Since the one-to-one mapping between the plurality of probe resources and the basic UE capability and DL beam index is known to the eNB, the UE capability of the UE sending the probe ON/OFF probe signal is determined by the eNB. It may be possible one or more TPs belonging to one or more eNBs detect the energy above a threshold on the probe resource at step 804 because the same ON/OFF probe signal is used in neighboring nodes for probe request. On energy detection above a threshold; one or more TPs belonging to one or more eNBs determine that there is a UE associated with a particular UE capability in its cell coverage area who has acquired SCI and wants to know the meaning of SCI.

At step 805, since the eNB knows the best DL beam index for the UE it transmits the probe response on the corresponding DL coverage beam. However, if the probe resource mapping is done with respect to UE capability only; then the eNB does not know the best DL beam index for the UE and it transmits the probe response on all the DL coverage beams in a sequential manner (i.e. DL beam sweeping is applied to the probe response). Since the UE determined the best (strongest) DL beam index it would monitor the corresponding beam specific search space for the reception of probe response message addressed by the Pr-RNTI. It may be possible at step 805, one or more TPs belonging to one or

TABLE 6

| Beam Index UE Capability | DL Beam#1 | DL Beam#2 | DL Beam#3 | ... | DL Beam#N |
|---|---|---|---|---|---|
| eMBB UE | Probe RID#1 | Probe RID#2 | Probe RID#3 | ... | Probe RID#L |
| MTC UE | Probe RID#L + 1 | Probe RID#L + 2 | Probe RID#L + 3 | ... | Probe RID#M |
| URLL UE | Probe RID#M + 1 | Probe RID#M + 2 | Probe RID#M + 3 | ... | Probe RID#N |

The probe resource is basically a resource on which the 5G eNB would detect energy reception. In an embodiment of the present disclosure, there is one-to-one mapping between the plurality of probe resources and the basic UE capability. In another embodiment of the present disclosure, there is one-to-one mapping between the plurality of probe resources and the DL beam index. This one-to-one mapping is either fixed in the standard specification or alternatively provided to the UE as part of the probing configuration indicated with parameter probe resource Group.

At step 803, UE transmits the probe ON/OFF signal on the first probe opportunity within the probe repetition period or UL beam sweeping period with the transmission power set according to the DL pathloss estimated from the received power measurement i.e. BRS_RSRP on best DL beam index. Alternatively, in the probing procedure based on ON/OFF probe signal the transmission power of the probe signal for the first transmission can be set according to the DL pathloss estimated from the received power measurement i.e. BRS_RSRP on best DL beam index plus a fixed step size to ensure energy detection is feasible at eNB side. Unlike the preamble based probing where eNB has to detect the preamble in this procedure eNB has to just detect energy above a threshold on the probe resource so probe re-transmissions may not be needed if the first transmission is done with sufficient power. On completion of transmission of probe request during the probe repetition period or the UL beam sweeping period, the UE starts the probe response window and starts monitoring the DL for reception of probe response.

more eNBs DL beam sweep the probe response which includes the system information (i.e. L1/L2 configuration) associated with the SCI value which the responding nodes transmitted in the PBCH/SBCH. This may result in unnecessary responses from neighboring nodes which detected the energy above a threshold. In an embodiment of the present disclosure, the probe response message includes at least one or more SCI value(s), probe resource identifier, system configuration associated with each SCI value and other configuration not covered/referred by the SCI value. In an embodiment of the present disclosure, the probe response message is addressed by the Pr-RNTI in each beam specific search space on the corresponding DL coverage beam. If the UE does not receive the probe response while the probe response timer is running then the UE re-transmit the probe ON/OFF signal on the determined probe resource upon expiry of the timer. However, the transmission power of the probe ON/OFF signal is incremented by a power ramping step size. UE is allowed to do such re-transmission of probe ON/OFF signal for pre-configured number of times with power ramping during each re-transmission attempt. Regardless of the probing procedure of FIG. 7 or FIG. 8, the UE initiated probing procedure is not subjected to contention resolution unlike the random access procedure. This is because the outcome of the probing procedure is acquisition of system information associated with one or more SCI value(s) acquired by the UE in a particular coverage area from the PBCH/SBCH. Therefore, the probe response may be received by plurality of UEs within the particular coverage area regardless of whether the probe request was initiated by plurality of UEs or even if initiated the probe request may not have been detected by the responding node. Upon acquiring the system information associated with the acquired SCI value if the UE desires to transition to connected mode then the normal contention based random access procedure is followed by the UE based on the applied system configuration.

The various steps mentioned in FIG. 8 illustrates the two step probing procedure on the cell of 5G RAT based on ON/OFF signal transmission; therefore either some of the steps can be combined, sequence of some steps can be modified or some steps can be omitted without deviating from the spirit of the illustrated procedure.

Figure 9:
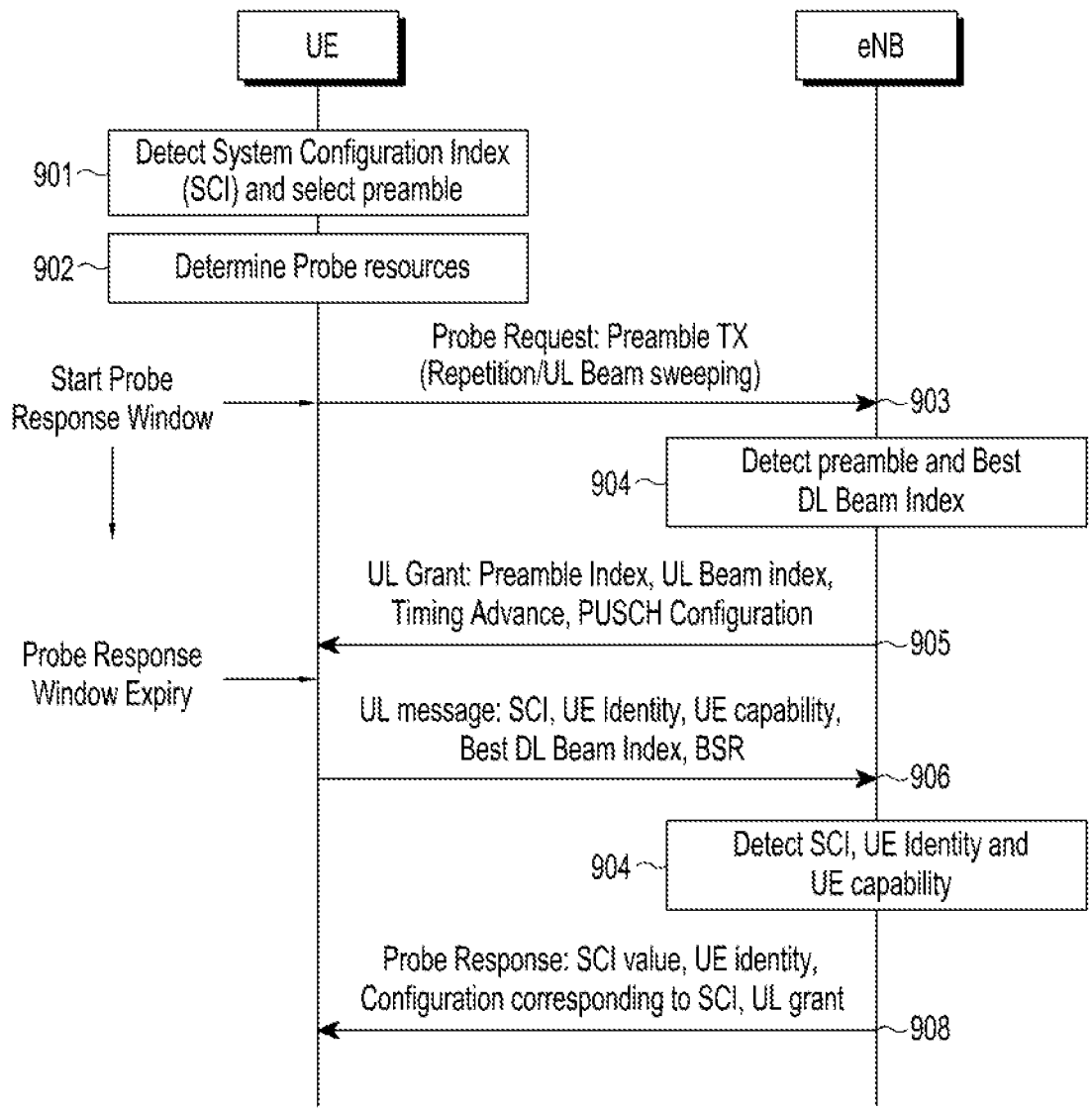
FIG. 9 is an illustration of four step probing procedure based on probe preamble transmission to acquire system information initiated by a UE when powered on according to one embodiment of the present disclosure.

FIG. 9 is an illustration of four step probing procedure based on probe preamble transmission to acquire system information initiated by a UE when powered on according to one embodiment of the present disclosure.

The drawback of the two step probing procedure is unnecessary responses from more than one eNB detecting the probe request in addition to the probe response from the desired eNB. Such unnecessary responses can be avoided with the four step probing procedure. Further, with the four-step probing procedure it may be possible to indicate either the basic UE capability or detailed UE capability to the network. It is possible to combine the probing procedure and random access procedure with the four step probing procedure based on preamble transmission.

At step 901 the UE acquires a plurality of SCI from the PBCH/SBCH and determines to initiate probing procedure to understand the meaning of SCI. To initiate probing procedure the UE needs to transmit the probe preamble on a probe resource configured in the UL. In an embodiment of the present disclosure, the probe signal is based on preamble transmission to indicate probe request. In the probing configuration received in the PBCH/SBCH a set of root sequences is provided based on which the UE derives a plurality of preambles.

At step 902 the UE determines the probe resource for the transmission of probe preamble based on the probe offset starting from the start of the PBCH period (refer FIG. 3A). The probe resource is basically a PRACH resource since a probe preamble will be transmitted on it as a probe signal.

At step 903 based on the determined best DL beam index the UE selects the probe preamble from the plurality of derived preambles depending on the best DL beam index determination. In an embodiment of the present disclosure, there is one-to-one mapping between the set of probe preambles and the set of DL coverage beams. This one-to-one mapping is either fixed in the standard specification or alternatively provided to the UE as part of the probing configuration. The UE transmits the selected probe preamble on the determined probe resource with a probe transmission power set according to the DL pathloss estimated from the received power measurement i.e. BRS_RSRP on best DL beam index.

At step 903, the UE transmits the selected probe preamble on the first probe opportunity within the probe repetition period or UL beam sweeping period with the same transmission power. In an embodiment of the present disclosure, the probe transmission power is set according to the DL pathloss estimated from the received power measurement on best DL beam index. In an embodiment of the present disclosure, the selected probe preamble is simply repeatedly transmitted or transmitted on different UL beams corresponding to the probe time slot with the same transmission power covering the probe repetition period or the UL beam sweeping period. In an embodiment of the present disclosure, during the probe repetition period UE repeats the transmission of selected probe preamble with the same transmission power for plurality of probe time slots. In another embodiment of the present disclosure, UE may apply different pre-coding for repetitive preamble transmission on each probe time slot of the UL beam sweeping period.

On completion of transmission of probe request during the probe repetition period or the UL beam sweeping period, the UE starts the probe response window and starts monitoring the DL for reception of UL grant. At step 904, the eNB detects the transmitted probe preamble by the UE during the probe repetition period or UL beam sweeping period. Since the eNB is aware of the one-to-one mapping between the set of probe preambles and the set of DL coverage beams, the best DL beam index is determined for the transmission of UL grant message. The probe preamble is only detected by the desired eNB because the set of root sequences provided in the probing configuration from which the plurality of probe preambles are derived are eNB specific. This avoids unnecessary responses from neighboring nodes where the root sequences are different, however within the desired node it may be possible that one or more TPs may detect the probe preamble and respond to the UE. Since all the TPs of the desired node are controlled by a central node the UL grant message can be coordinated across the responding TPs.

At step 905, a coordinated response including at least the UL grant, detected preamble index, best UL beam index, UL timing advance, SFN (if SFN is not transmitted in PBCH/SBCH) and PUSCH configuration is sent on the best DL coverage beam determined by the responding TPs. In an embodiment of the present disclosure, the eNB determines the best UL beam index based on the probe time slot in which the probe preamble was decoded if UL beam sweeping is applied. In an embodiment of the present disclosure, the UL grant message is addressed by the Pr-RNTI in the beam specific search space on the DL coverage beam identified as best DL beam index. The responding eNB may repeat the UL grant message on the best DL coverage beam determined at step 904. At step 905, UE starts monitoring the beam search space corresponding to the best DL beam index in order to receive UL grant from concerned eNB of 5G RAT. On receiving the PDCCH/ePDCCH addressed by the Pr-RNTI in the beam specific search space the UE decodes the UL grant message from the concerned cell of the 5G node.

If the UE does not receive the UL grant message while the probe response timer is running then the UE re-transmit the selected probe preamble upon expiry of the timer. However, the transmission power of the probe preamble is incremented by a power ramping step size. The UE is allowed to do such re-transmission of probe preamble for pre-configured number of times with power ramping of preamble transmission power during each re-transmission attempt.

Based on the UL grant at step 905, the UE transmits a UL message on the indicated UL beam index based on the PUSCH configuration and UL timing advance received in the UL grant message. If the best DL beam index as determined by the UE changes after the reception of UL grant message then the UE may include the new best DL beam index in UL message at step 906. Else the same best DL beam index is included in UL message as indicated during the transmission of probe preamble. The UL message includes at least one or more SCI value(s) acquired from PBCH/SBCH, UE identity, best DL beam index, Buffer Status Report (BSR) and basic UE capability or detailed UE capability.

At step 907, the eNB detects plurality of SCI(s), UE identity and UE capability sent in UL message by the UE. If multiple UEs transmit the UL message at step 906, then the eNB resolves the contention by transmitting probe response at step 908 which includes the UE identity transmitted by the UE in UL message. The probe response message includes a plurality of SCI value(s), the UE identity and the system configuration associated with each SCI value and other configuration not covered/referred by the SCI value. If at step 906, the UE transmits the UL message without the SCI then the eNB understands at step 907 the procedure is a normal random access procedure. The UL grant message in step 905 may also be referred as a probe response message or a random access response message. The probe response message in step 908 may also be referred as a contention resolution message. If the probing procedure in (900) is followed then a separate RACH procedure is not needed if the UE intends to establish RRC connection.

The various steps mentioned in FIG. 9 illustrates the four-step probing procedure on the cell of 5G RAT based on preamble transmission; therefore either some of the steps can be combined, sequence of some steps can be modified or some steps can be omitted without deviating from the spirit of the illustrated procedure.

Figure 10:
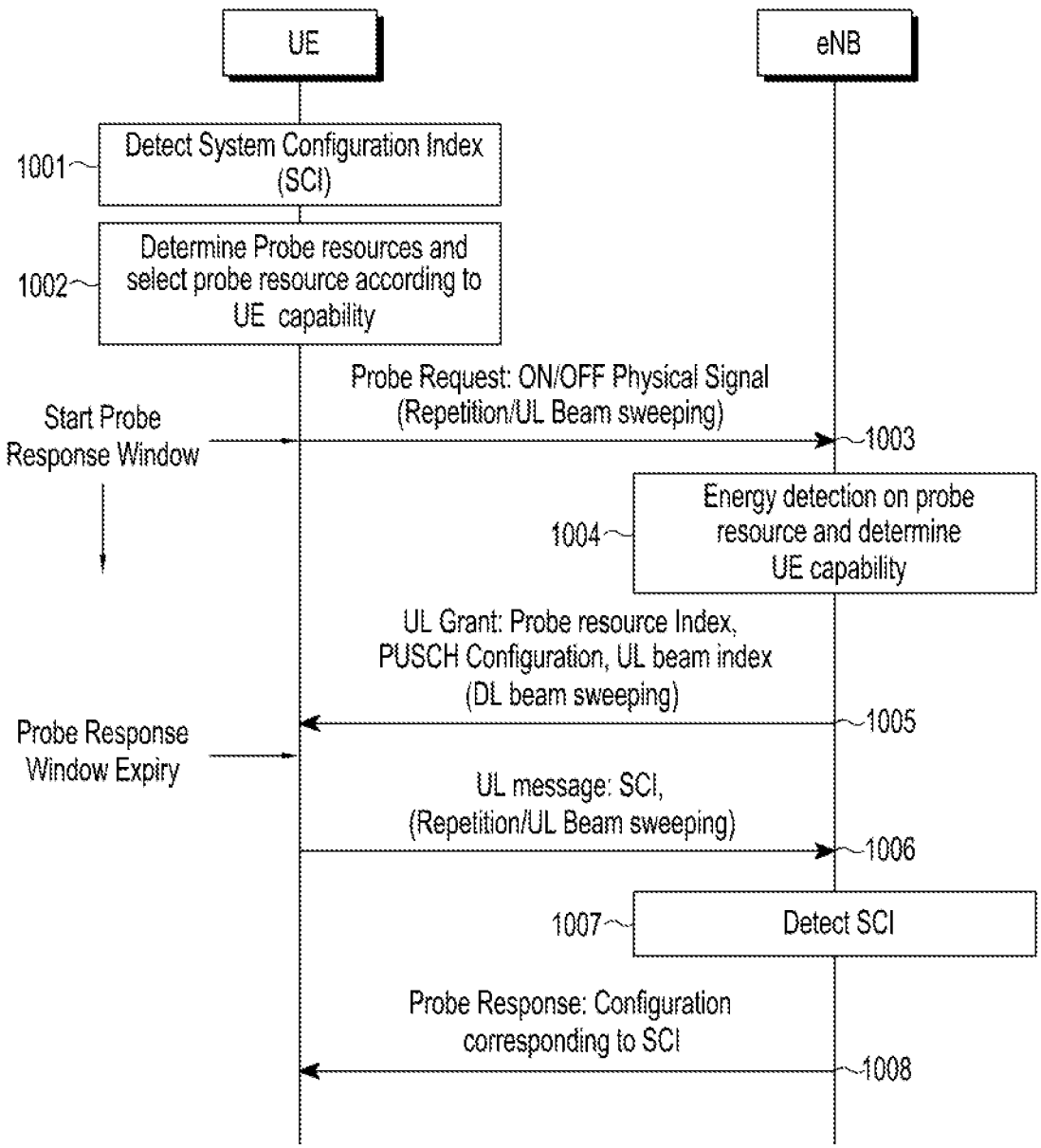
FIG. 10 is an illustration of four step probing procedure based on probe ON/OFF signal transmission to acquire system information initiated by a UE when powered on according to another embodiment of the present disclosure.

FIG. 10 is an illustration of four step probing procedure (1000) based on probe ON/OFF signal transmission to acquire system information initiated by a UE when powered on according to another embodiment of the present disclosure.

The drawback of the two step probing procedure is unnecessary responses from more than one eNB detecting the probe request in addition to the probe response from the desired eNB. Such unnecessary responses can be avoided with the four step probing procedure.

Referring to FIG. 10, at step 1001 the UE acquires a plurality of SCI(s) from the PBCH/SBCH and determines to initiate probing procedure to understand the meaning of SCI. To initiate probing procedure UE needs to transmit the probe request on a probe resource configured in the UL. The probe signal is based on an ON/OFF physical signal transmission to indicate probe request. One example of design of such an ON/OFF physical signal is similar to the scheduling request (SR) transmission in LTE. Since the same ON/OFF signal will be used by UEs of different UE capability (eg. eMBB UE, m-MTC UE, URLL UE etc) different probe resources need to be provided to differentiate the basic UE capability. A plurality of probe resources in time and/or frequency can be used to transmit the ON/OFF probe signal to indicate different UE capabilities (refer FIG. 3B). There is one-to-one mapping between the probe resource and the associated UE capability.

At step 1002 the UE based on its UE capability determines the probe resource for the transmission of probe ON/OFF signal. The plurality of probe resources could be distributed either in time domain and/or frequency domain and may be referred by a probe resource identifier (refer FIG. 3B for probe RID). Such mapping of probe resources and the parameters probe offset, probe slot period or probe slot offset are sent in the probing configuration. Using the parameter probe offset starting from the start of the PBCH period and the parameter probe slot period or probe slot offset (refer FIG. 3B) the UE determines the probe resource based on it UE capability. The probe resource is basically a resource on which the eNB would detect energy reception.

In an embodiment of the present disclosure, there is one-to-one mapping between the plurality of probe resources and the basic UE capability. This one-to-one mapping is either fixed in the standard specification or alternatively provided to the UE as part of the probing configuration.

At step 1003, the UE transmits the probe ON/OFF signal on the first probe opportunity within the probe repetition period or UL beam sweeping period with the transmission power set according to the DL pathloss estimated from the received power measurement i.e. BRS_RSRP on best DL beam index. Alternatively, the determined transmission power is incremented by a fixed step size to ensure energy detection at the eNB in the first attempt itself. On completion of transmission of probe request during the probe repetition period or the UL beam sweeping period, the UE starts the probe response window and starts monitoring the DL for reception of UL grant.

At step 1004, the eNB detects the transmitted probe signal by the UE during the probe repetition period or UL beam sweeping period if the detected energy is above a certain threshold. Since the one-to-one mapping between the plurality of probe resources and the basic UE capability is known to the eNB, the UE capability of the UE sending the probe ON/OFF probe signal is determined by the eNB. It may be possible one or more TPs belonging to one or more eNBs detect the energy above a threshold on the probe resource at step 1004 because the same ON/OFF probe signal is used in neighboring nodes for probe request. On energy detection above a threshold; one or more TPs belonging to one or more eNBs determine that there is a UE associated with a particular UE capability in its cell coverage area who has acquired SCI and wants to know the meaning of SCI. Even though unnecessary probe responses can be avoided but multiple nodes sending the UL grant message cannot be avoided. Since the UL grant comprises less information compared to the probe response contents it is somewhat beneficial compared to unnecessary probe responses.

Since all the TPs of the desired node are controlled by a central node the UL grant message can be coordinated across the responding TPs. At step 1005, a coordinated response including at least the UL grant, detected probe resource id, PUSCH configuration, best UL beam index (optional) is sent on all the DL coverage beams (i.e. DL beam sweeping). In an embodiment of the present disclosure, the eNB determines the best UL beam index based on the probe time slot in which the ON/OFF probe signal was detected above a threshold; if UL beam sweeping is applied. In an embodiment of the present disclosure, the UL grant message is addressed by the Pr-RNTI in each beam specific search space associated with each DL coverage beam. At step 1005, UE starts monitoring the beam search space corresponding to the best DL beam index in order to receive UL grant from concerned 5G eNB of 5G RAT. On receiving the PDCCH/ePDCCH addressed by the Pr-RNTI in the beam specific search space the UE decodes the UL grant message from the concerned cell of the node.

If the UE does not receive the UL grant message while the probe response timer is running then the UE re-transmit the ON/OFF probe signal upon expiry of the timer. However, the transmission power of the probe signal is incremented by a power ramping step size. UE is allowed to do such re-transmission of probe signal for pre-configured number of times with power ramping during each re-transmission attempt. Based on the UL grant at step 1005, UE transmits UL message on the indicated UL beam index based on the PUSCH configuration received in the UL grant message.

Since the best DL beam index is already determined by the UE then the UE may include the best DL beam index in UL message at step 1006. The UL message includes at least a plurality of SCI value(s) acquired from PBCH/SBCH and best DL beam index (optional).

At step 1007, the desired eNB detects one or more SCI value(s) sent in UL message by the UE. If the detected SCI value is different from the SCI value the 5G eNB is broadcasting in PBCH/SBCH then that node will not send the probe response thus avoiding unnecessary probe responses. If multiple UEs transmit the UL message at step 1006, then it is not an issue because the eNB needs to detect at least one UL message with one or more SCI value(s) to transmit the probe response at step 1008. The probe response message includes plurality of SCI value(s) and the system configuration associated with each SCI value and other configuration not covered/referred by the SCI value. The probe response message in step 1008 may be transmitted on the best DL beam index or can be subjected to DL beam sweeping. If the probing procedure in (1000) is followed then a separate RACH procedure is needed if the UE intends to establish RRC connection.

The various steps mentioned in FIG. 10 illustrates the four-step probing procedure on the cell of 5G RAT based on ON/OFF probe signal transmission; therefore either some of the steps can be combined, sequence of some steps can be modified or some steps can be omitted without deviating from the spirit of the illustrated procedure.

Figure 11A:
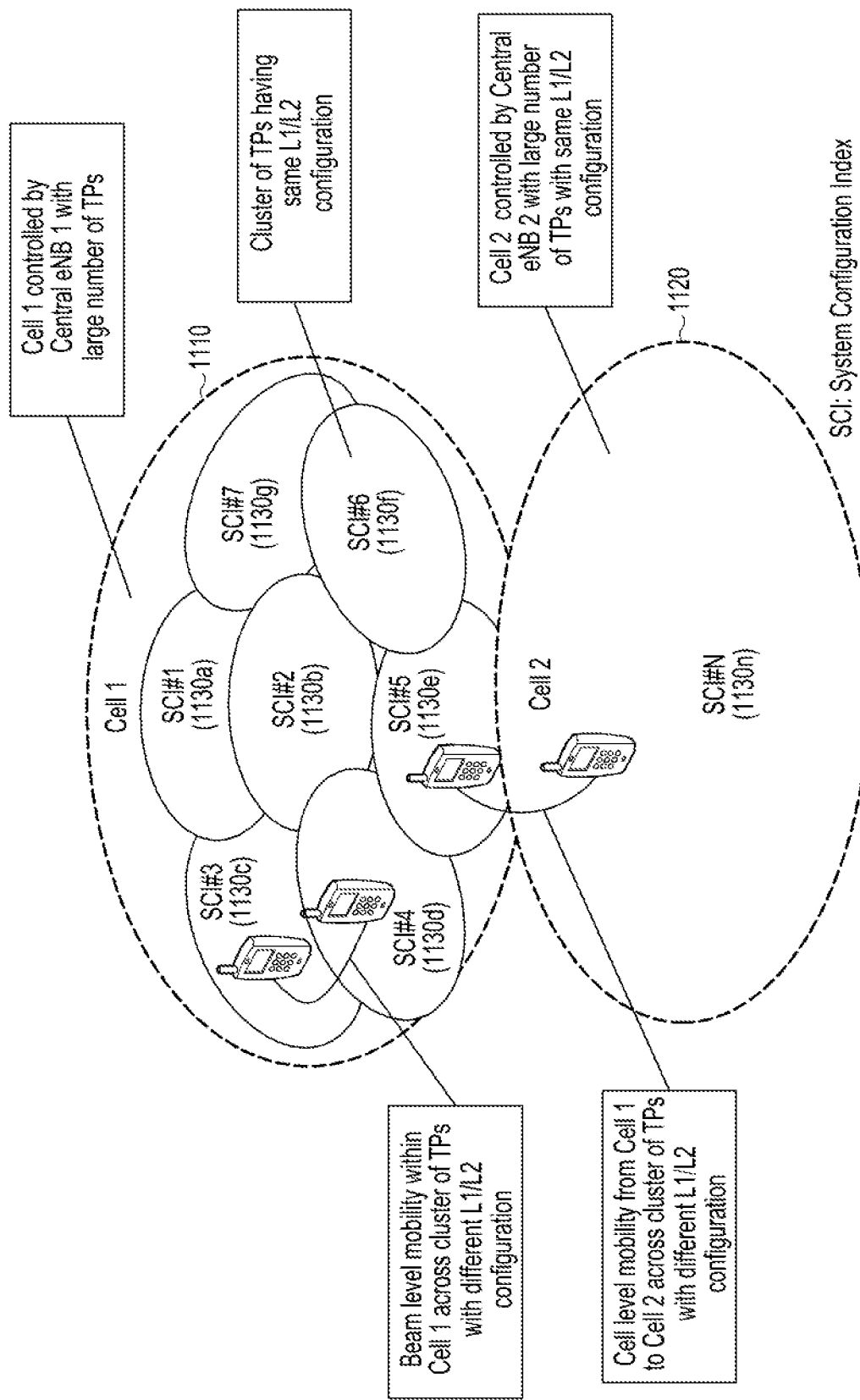
FIGS. 11A and 11B are an illustration of scenarios concerning handling of change in system configuration index (SCI) according to one embodiment of the present disclosure.
Figure 11B:
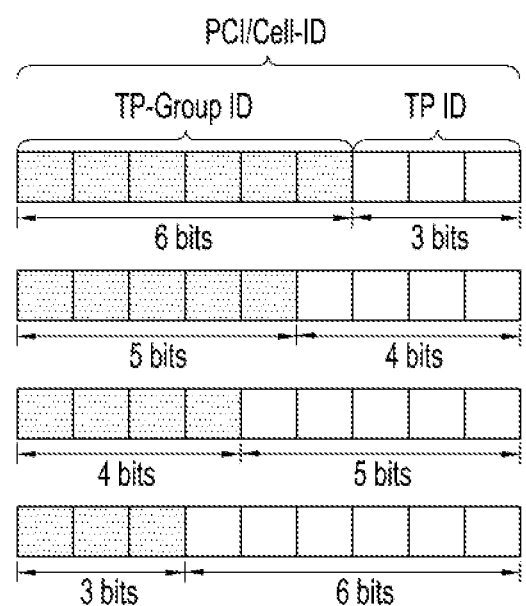

FIGS. 11A and 11B are an illustration of scenarios concerning handling of change in system configuration index (SCI) according to one embodiment of the present disclosure.

Referring to FIG. 11A, scenarios concerning handling of change in system configuration index (SCI) when the UE is either in idle mode mobility or connected mode mobility are shown. As depicted in FIG. 11A, there is a plurality of cells of the 5G RAT (1110, 1120, so on and so forth) each controlled by central node (referred as eNB). The coverage area of the cell served by carrier frequency of the 5G RAT may use a large number of TPs controlled by the central node (i.e. eNB). Traditionally, the system configuration is associated with a cell where the UE either upon handover (in connected mode) or cell re-selection (in idle mode) acquire the system information associated with the target (re-selected) cell. This traditional approach where system configuration is associated with a cell is depicted for Cell 2 (1120) where all the TPs within the cell coverage area (1130*n*) have the same system configuration i.e. L1/L2 configuration (SCI #N). With this approach different cells can broadcast different RACH configurations but the RACH configuration within the cell coverage area (1120) is same. Assuming the applicability of cell specific system configuration for the cell of 5G RAT then all TP's in a cell have same system configuration (i.e. L1/L2 configuration). In such scenario the change in cell area (handover/cell-reselection) is known to the UE such that the PCI changes upon handover/cell-reselection and hence the associated SCI. However, one consequence of cell specific system configuration in the context of 5G cell is that all TP's will have RACH at the same time. This will result in increase of RACH load support at the eNB as depicted in Table 7. Assume one node with 500 TP's. Further, assume RACH average load of X per second per TP, which can be handled with RACH occasions in one subframe. Also, assume RACH peak load to be ten times of average load of X per second per TP. This then results in the following:

TABLE 7

|  | All TP's have RACH occasion at same subframe | All TP's have RACH occasion in different subframes | Cluster of 50 TP's have RACH occasion in same subframe |
|---|---|---|---|
| Average RACH load per subframe that node has to be able to handle | 500 * X | X | 50 * X |
| Peak load per subframe that node has to be able to handle | 500 * 10 * X = 5000 * X | 10 * X | 50 * 10 * X = 500 * X |
| Consequence | Expensive hardware | Cheap hardware | |

However, in 5G wireless system this need not be strict restriction where it is possible that several coverage area (1130*a*, 1130*b*, 1130*c* so on and so forth) served by a different cluster of TPs within a cell coverage area (1110) i.e. Cell 1 have different system configuration i.e. L1/L2 configuration (SCI #1. SC #2, SCI #3 so on and so forth). One advantage is that within a cell coverage area (1110) different cluster of TP's (1130*a*, 1130*b*, 1130*c* so on and so forth) can have a different RACH configuration. This enables idle mode RACH load distribution for the central node controlling one large cell (1120) handling large number of TPs as depicted in Table 7. In connected mode for UE, the eNB can configure different RACH configurations for different UEs. For e.g. a cell is supporting RACH access every 1 ms, but some UE's are given a configuration for t=0, 10 ms, 20 ms . . . and some other UE's for t=1, 11, 21 ms, . . . This approach avoids having to reconfigure many UE's in case of UE mobility which would have been the case if the same RACH applicable for entire cell is broadcasted and UE acquires the configuration in idle mode.

FIG. 11B is an illustration of fragmentation of the physical Cell-Id (PCI) into TP Group Id and TP-Id according to one embodiment of the present invention.

Referring to FIG. 11B, the "physical Cell Identifier" (PCI) is identified by decoding the synchronization signal like PSS and SSS in LTE. The Cell-Id is frequency specific in LTE i.e. cells with same identifier on different carrier frequencies can be served from the same eNB. The transmitted synchronization signals (i.e. PSS and SSS) are pre-defined unique sequences which upon decoding by the UE represents the physical identity and physical identity group. The PSS uses three sequences for the physical identity while the SSS uses 168 sequences for the physical identity group, which together determines one out of the 504 physical cell identities (PCIs) represented by 9 bits. For RAT (5G RAT) similar approach can be considered wherein upon decoding the PSS/SSS the 9 bits of PCI/Cell-Id can be used to determine the TP-Group Id and the TP-Id. The TP-Id may be 3 bits, 4 bits, 5 bits or 6 bits depending upon the number of TPs within the TP-Group Id as depicted in FIG. 11B. The number of bits used for TP-Group Id and TP-Id provides flexibility to the network operator for supporting network deployment with different architecture options. The TP-Id size can be included in the MIB broadcasted on PBCH. For eg. the parameter "TP-IdSize" can be 2-bit indication in MIB broadcasted on PBCH which indicates the size of the TP-Id such that '00' indicates TP-Id is 3-bits, '01' indicates as TP-Id is 4-bits, '10' indicates TP-Id is 5-bits and '11' indicates TP-Id is 6-bits. The "TP-IdSize" parameter can also be just 1-bit indication such that '0' indicates TP-Id is either 3/4 bits and '1' indicates TP-Id is 6/5 bits. Upon decoding the PCI/Cell-Id and determining the TP-Id size after acquiring the MIB the UE can determine the TP-Id of the TP on which the UE decides to camp. The TP-Group Id is determined implicitly from the remaining bits of PCI/Cell-Id after determining the TP-Id. In an embodiment of the present disclosure, the Cell-Id/PCI is fragmented into TP-Group Id and TP-Id wherein the parameter TP-IdSize broadcasted on PBCH indicates the number of LSB bits used for the TP-Id.

The PCI/Cell-Id space of 9 bits based on 504 identities is taken as an example to illustrate the fragmentation of PCI/Cell-Id into TP-Group Id and TP-Id and should not be considered as a limiting case. One advantage of the fragmentation of PCI/Cell-Id is that the UE can assume the system information applicable for a newly detected TP on the serving frequency after decoding PSS/SSS is same if the TP-Group Id remains same as that of the currently serving/camped TP. Network operator can plan or co-ordinate the configuration of system information to be same within the TP-Group Id. This means a cluster of TPs can be configured with the same system information, for example, the RACH configuration, some L1/L2 configuration, MIMO configuration can be same across the cluster of TPs. The TP-Group Id identifies such a cluster/group of TPs, wherein the cluster of TPs may belong to same eNB or may belong to different eNB. If the TP-Group Id of the newly detected intra-frequency cell/TP remains same then UE can assume the currently applied system information is also applicable for the newly detected cell/TP. Such an approach of fragmenting the PCI/Cell-Id into TP Group Id and TP-Id avoids the requirement for the UE to read the MIB i.e. PBCH for every newly detected cell/TP or when UE changes the camped beam of the serving TP and hence useful for reducing the UE battery power consumption. In an embodiment of the present disclosure, the system information associated with one or more TP-Id(s) within the same TP-Group Id is same and UE is not required to acquire system information for a newly detected TP-Id if it belongs to the same TP-Group Id previously determined.

It can be possible to design the synchronization signals as combination of PSS/SSS and beam index sequences. The beam index sequence can also represent a 9 bit space which can be partitioned into "Beam Identifier" i.e. Beam-Id and "System Information Identifier" i.e. SI-Id. This could be fixed partition of 3 bits of MSB for "System Information Identifier" i.e. SI-Id and remaining 6 bits for Beam-Id. Alternately the 4 bits of MSB can indicate the SI-Id while remaining 5 bits represents the Beam-Id. The SI-Id indicates the system information configuration applicable in the detected cell/TP. The actual parameters for system information are provided in one or more system information blocks which can be broadcasted or some of the blocks can be sent in UE dedicated manner. If a fixed partitioning approach is considered then the number of bits for Beam-Id depends upon the maximum number of coverage beams to be supported in the system. If a flexible partitioning approach is considered then the number of bits for Beam-Id can be indicated with a parameter "Beam-IdSize" in the MIB similar to the parameter "TP-IdSize".

Upon acquiring the MIB and determining the TP-Id size and Beam-Id size (optionally), the UE is able to determine the TP-Id, the TP-Group Id, the Beam-Id and the SI-Id. If the SI-Id of the newly detected intra-frequency cell/TP remains same then UE can assume the currently applied system information is also applicable for the newly detected cell/TP. If the SI-Id is indicated through synchronization signal like beam index sequence then the system information can be different for the same TP-Group Id. This means a cluster of TPs having the same system information is independent of the TP-Group Id but linked to the SI-Id. The SI-Id identifies such a cluster/group of TPs having same system information, wherein the cluster of TPs may belong to same eNB or may belong to different e/NB. Therefore based on SI-Id indicated through the physical layer signal like beam index sequence the UE is able to determine whether system information needs to be re-acquired or not. The main purpose of the synchronization signals like PSS/SSS and beam index sequence is for downlink timing reference, subframe or radio frame boundary identification and additional scrambling of the physical channels such as LTE equivalent of PDCCH, PDSCH, PUSCH, PUCCH etc. The identity space provided by these sequences i.e. PSS/SSS and beam index sequence is exploited for conveying one or more identities such as PCI/Cell-Id, TP-Id, TP-Group Id, Beam-Id, SI-Id etc required for the overall system operation like cell detection, TP-Id switching, beam switching and beam tracking, system information acquisition so on and so forth.

In the idle mode, UE monitors the DL coverage beams of camped cell and neighbor cell for cell re-selection. For change in SCI value the UE need to check the SCI before every paging reception and also before every measurement. (Change of SCI value means change of L1/L2 configuration or system configuration). In this alternative approach UE is required to read the MIB before every paging opportunity of the paging cycle. This approach seems simple because UE can read the PBCH/SBCH every paging cycle (assuming PBCH cycle is smaller than paging cycle). However, this would increase the UE idle mode power consumption (i.e. every paging cycle the UE has to receive the paging message and the SCI value before that). Further, this also does not address the fact that the SCI might also span other information like neighbor frequency/cell information which may be different in different parts of the cell. This would mean UE should then check before every measurement it performs what the SCI value is. Another third approach is whenever the UE changes DL coverage beam (i.e. change of best DL beam index) in idle mode then it has to check for the new SCI value. As long as the UE is camping on the same beam (i.e. same strongest PCI/cell id+beam id) it does not need to check the SCI value again unless it receives an indication in paging that the SCI value is changed. With this approach, the UE does not need to check the SCI value before every paging opportunity or before every measurement. As a consequence the battery power is not wasted. However, this approach may impose a restriction where different beams in a cell which are using the same beam index have to use the same SCI value.

In the connected mode, during beam level mobility the L1/L2 configuration may change because different TP clusters use different configuration. Since the beam level mobility is transparent to the UE, the UE can track only the DL coverage beams. Whenever the UE changes DL coverage beam (i.e. change of best DL beam index), it has to check for the new SCI value. The SCI value which is just an index indicated in the PBCH/SBCH such that UE after detecting change in SCI value looks into the SIT and applies the configuration corresponding to the changed SCI value. UE autonomously releases the old configuration and apply the new configuration. Such autonomous reconfiguration by the UE does not lead to resetting of the layer 2 protocol stack. During the cell level mobility in connected mode, UE receives the handover command from the source cell. In such scenario it would be natural choice to use RRC signaling for reconfiguration. Such an option is desirable for the standalone mode where the RRC reconfiguration is directly coming from the 5G node.

Figure 12A:
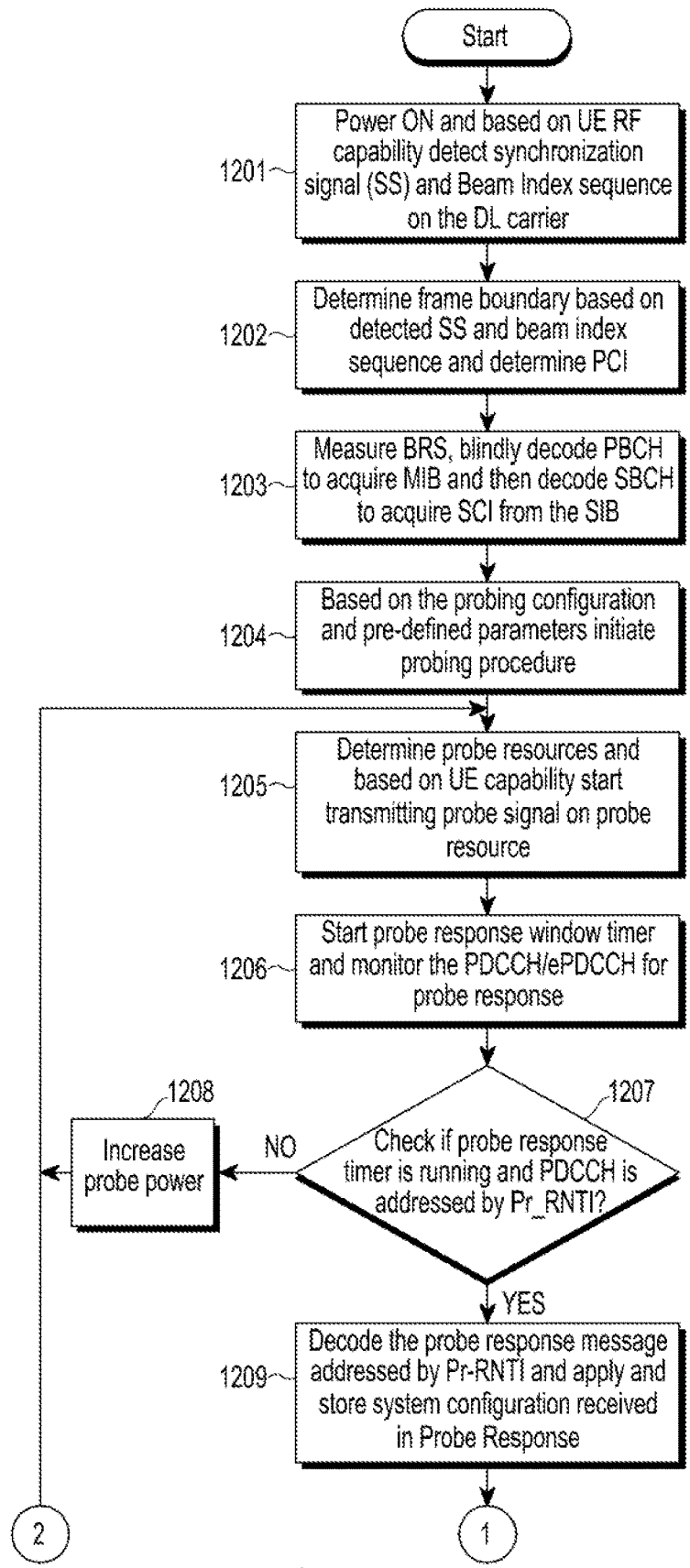
FIGS. 12A and 12B are an illustration of operations at the UE side to acquire system information based on two step probing procedure according to one embodiment of the present disclosure.
Figure 12B:
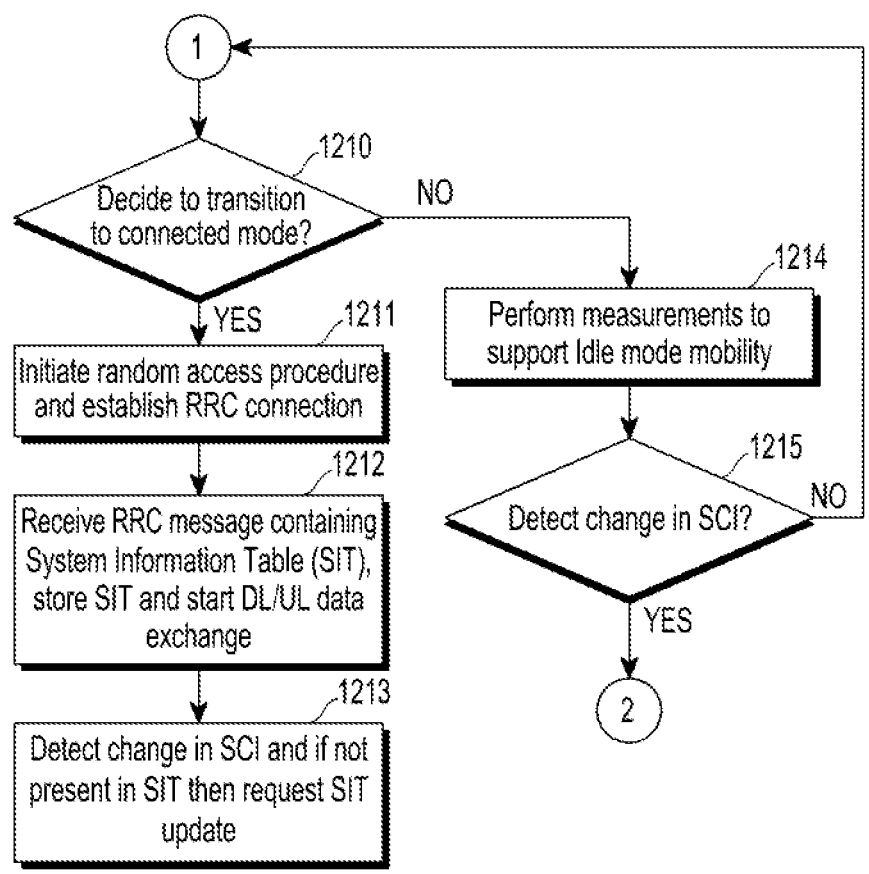

FIGS. 12A and 12B are an illustration of operations at the UE side to acquire system information based on two step probing procedure according to one embodiment of the present disclosure.

Referring to FIGS. 12A and 12B, at step 1201, the UE powers ON and based on the UE radio frequency (RF) capability, UE starts the cell search on the minimum DL bandwidth on the frequency band supported by the UE.

At step 1202, the cell search operation involves detection of synchronization signal and subsequently detecting the beam index sequence to determine the physical cell identity (PCI) of the detected cell. Further, the UE determines the frame boundary and start of DL frame and determines the BRS resources based on PCI and detected beam index sequence.

At step 1203, the UE starts measuring the BRS on the determined BRS resources and subsequently start to blindly decode the PBCH. On decoding the PBCH UE acquires the MIB comprising at least: the DL system bandwidth. System Frame Number (SFN), Probing configuration, SBCH offset. Subsequently, the UE decodes the SBCH to acquire plurality of SCI. UE acquires at least: the primary PLMN. One or more system configuration index (SCI), tracking area code (TAC), TP-IdSize and parameters for access control barring (ACB) from the SBCH. Based on the TP-IdSize, UE identifies the partitioning of the detected PCI/Cell-Id into the TP Group-Id and TP-Id.

At step 1204, the UE initiates the probing procedure to know the meaning of SCI based on the probing configuration.

At step 1205, the UE determines the probe resource to transmit the probe request signal. If the probe request is based on probe preamble then the UE selects the probe preamble based on UE capability and best DL beam index. If the probe request is based on ON/OFF probe signal then the UE selects the probe resource based on the UE capability and best DL beam index.

At step 1206, the UE transmits the probe request applying either repetition or UL beamforming and starts the probe response window timer upon completing transmission of probe request. While the probe response timer is running UE monitors the DL in the beam specific search space for PDCCH/ePDCCH.

At step 1207, if the timer expires and there is no ePDCCH addressed by Pr_RNTI to the UE then control goes to step 1208 else at step 1209 UE decodes the probe response message addressed by the Pr_RNTI. The probe response message includes the system information (i.e. L1/L2 configuration) corresponding to each SCI value and other configuration not covered/referred by the SCI value which is applicable to coverage area of the camped cell. The UE applies and stores the system configuration received in probe response and at step 1210 decide either to transition to connected mode or continue in idle mode. The system information (i.e. L1/L2 configuration) received in the probe response is sufficient for the UE to initiate random access procedure. UE establishes RRC connection by initiating random access procedure at step 1211. On establishing RRC connection UE receives RRC message containing SIT, which the UE stores and start normal DL/UL data exchange with the eNB (103) at step 1212. During connected mode operation, the UE performs handover and beam switching based on its mobility and if the UE detects change in SCI value for which corresponding system configuration is not present in SIT or if the SIT validity timer is about to expire then at step 1213 UE requests SIT update from eNB (103).

At step 1208, when the UE does not receive probe response for a probe requested transmitted earlier then the UE increases the probe request power by a pre-defined step and re-transmit the probe request on the probe resource such that control moves to step 1205. When the UE decide to remain in idle mode at step 1214, the UE performs BRS measurements and idle mode procedures like monitoring paging and performing cell re-selection. During idle mode mobility if UE detects change in SCI value at step 1215, then the UE starts the probing procedure at step 1205 to find meaning of the new SCI value if the UE does not have the SIT or the configuration associated with new SCI value is not present in the stored SIT.

The various steps mentioned in FIGS. 12A and 12B illustrate the UE operation to acquire system information based on two step probing procedure; therefore either some of the steps can be combined, sequence of some steps can be modified or some steps can be omitted without deviating from the spirit of the illustrated UE operation.

Figure 13:
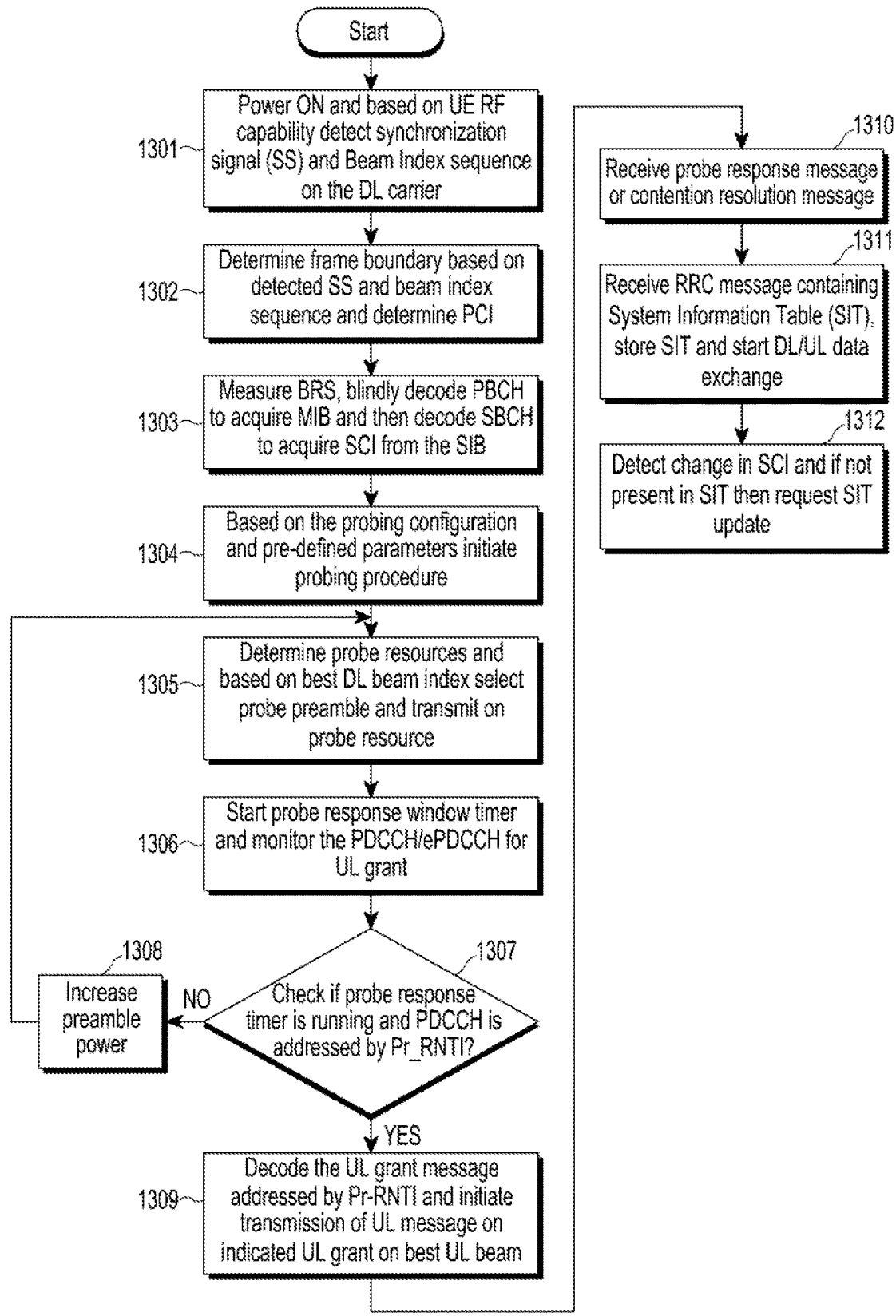
FIG. 13 is an illustration of operations at the UE side to acquire system information based on four step probing procedure according to one embodiment of the present disclosure.

FIG. 13 is an illustration of operations at the UE side to acquire system information based on four step probing procedure according to one embodiment of the present disclosure.

The steps 1301 to 1304 are similar to steps 1201 to 1204.

Referring to FIG. 13, at step 1305, the UE determines the probe resource to transmit the probe request signal. Since the probe request is based on probe preamble, the UE selects the probe preamble based on best DL beam index. The set of probe preambles is based on the root sequence received in the probing configuration acquired from MIB. Upon transmission of the probe preamble which is subjected to UL beam sweeping with a power level estimated from the DL pathloss encountered on the best DL beam index, UE starts the probe response timer.

At step 1306, the UE starts monitoring the PDCCH/ePDCCH for UL grant. While the timer is running if the UE receives the UL grant addressed by the Pr_RNTI then UE decodes the UL grant message which comprises at least the UL grant, detected preamble index, best UL beam index, UL timing advance, SFN (if SFN not transmitted in PBCH/SBCH) and PUSCH configuration. If the timer expires and the UE does not receive the UL grant message then the UE increases the probe preamble power at step 1308 and attempts a probe preamble re-transmission on probe resource at step 1305. Based on the UL grant and indicated UL beam index, the UE transmits the UL message comprising at least one or more SCI value(s) acquired from PBCH/SBCH, UE identity, best DL beam index, buffer status report (BSR) and basic UE capability or detailed UE capability at step 1309. UE receives the probe response message at step 1310 which includes plurality of SCI value, system information associated with each SCI value and other configuration not covered/referred by the SCI value, UE identity and UL grant.

If at step 1309, the SCI is not included in UL message then the probe response message is nothing but the contention resolution message for normal random access procedure. On establishing RRC connection the UE receives RRC message containing SIT and the associated SIT validity timer, which the UE stores and start normal DL/UL data exchange with the eNB (103) at step 1311. During connected mode operation, the UE performs handover and beam switching based on its mobility and if UE detects change in SCI value for which corresponding system configuration is not present in SIT or the SIT validity timer is about to expire then at step 1312 the UE requests SIT update from the eNB (103).

The various steps mentioned in FIG. 13 illustrates the UE operation to acquire system information based on four step probing procedure; therefore either some of the steps can be combined, sequence of some steps can be modified or some steps can be omitted without deviating from the spirit of the illustrated UE operation.

Figure 14:
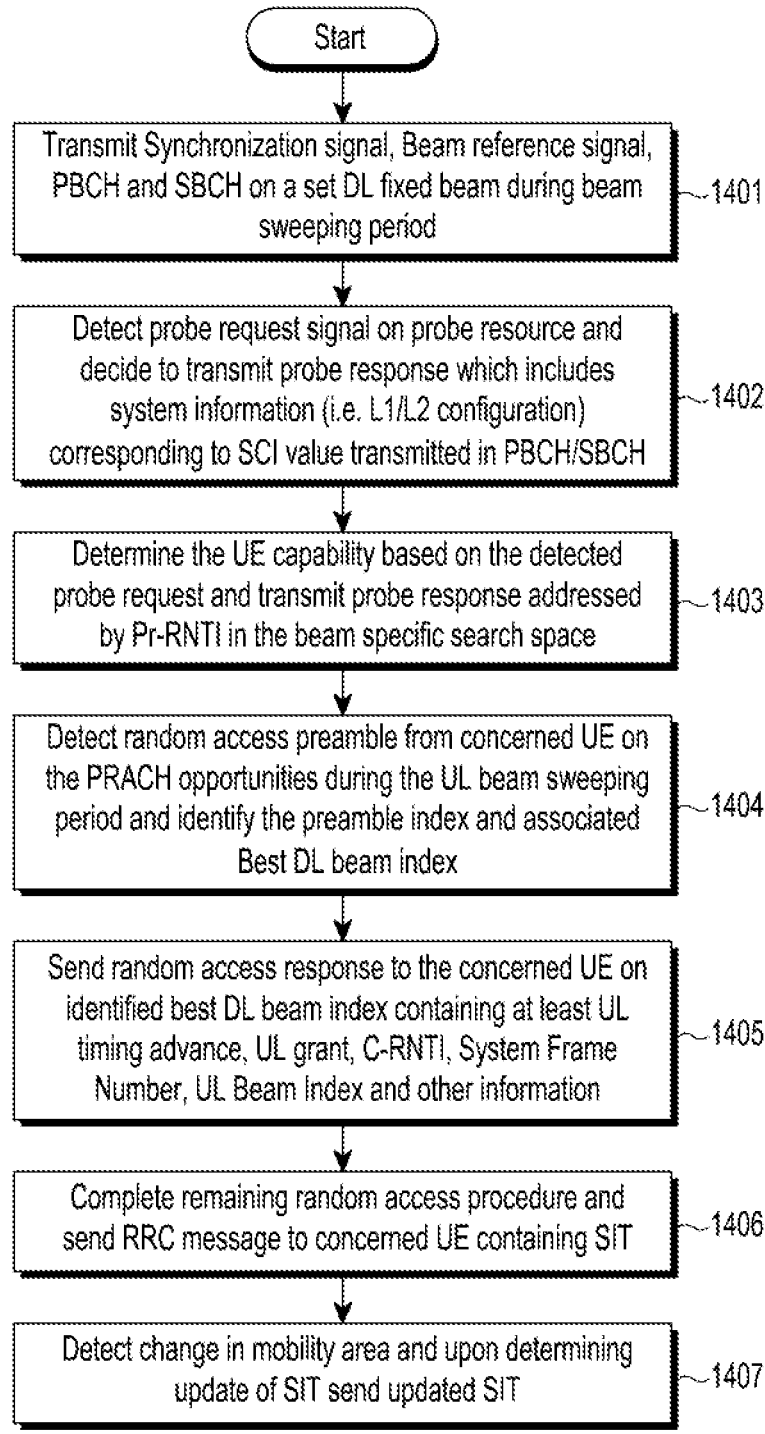
FIG. 14 is an illustration of operations at the eNB side to provision system information based on probing procedure according to one embodiment of the present disclosure.

FIG. 14 is an illustration of operations at the eNB to provision system information based on probing procedure according to one embodiment of the present disclosure.

Referring to FIG. 14, at step 1401, the eNB (103) transmits in the minimum DL bandwidth the synchronization signal, PBCH, SBCH and BRS periodically according to the PBCH cycle and SBCH cycle respectively. These signals are transmitted on plurality of DL fixed beams so that the signals are available in the cell coverage area. The MIB is transmitted by eNB on the PBCH/SBCH which includes at least the DL system bandwidth, System frame number (SFN), primary PLMN, one or more system configuration index (SCI), probing configuration, SBCH offset, tracking area code (TAC), TP-IdSize and parameters for access control barring (ACB).

At step 1402, the eNB (103) detects the probe request signal on the probe resource and determines that there is a UE in it's cell coverage which has acquired the SCI but does not know the meaning of the SCI value.

At step 1403, the eNB (103) determines the UE capability and best DL beam index either based on the detected probe request or based on the probe resource in which the probe request was detected. The eNB (103) transmits the probe response in the DL on the determined best DL beam addressed by the Pr_RNTI in the beam specific search space comprising at least plurality of SCI value(s), preamble index or probe resource identifier and the system configuration associated with each SCI value and other configuration not covered/referred by the SCI value.

At steps 1404 to 1406, the eNB (103) upon detection of the random access preamble from a concerned UE completes the contention based RACH procedure by resolving contention.

At step 1406, the eNB (103) transmits a dedicated RRC message to the concerned UE containing the SIT and the associated SIT validity timer. Alternatively the SIT can also be broadcasted by the eNB (103). During connected mode operation of the concerned UE, if the eNB (103) detects the UE has moved in a mobility area for which the UE does not have valid system configuration or based on UE context knows the SIT validity timer is about to expire or on receiving a SIT update request from the UE then the eNB (103) sends a SIT update through dedicated RRC signaling to the concerned UE.

The various steps mentioned in FIG. 14 illustrates the eNB operation to provision system information based on the probing procedure; therefore either some of the steps can be combined, sequence of some steps can be modified or some steps can be omitted without deviating from the spirit of the illustrated eNB operation.

Figure 15A:
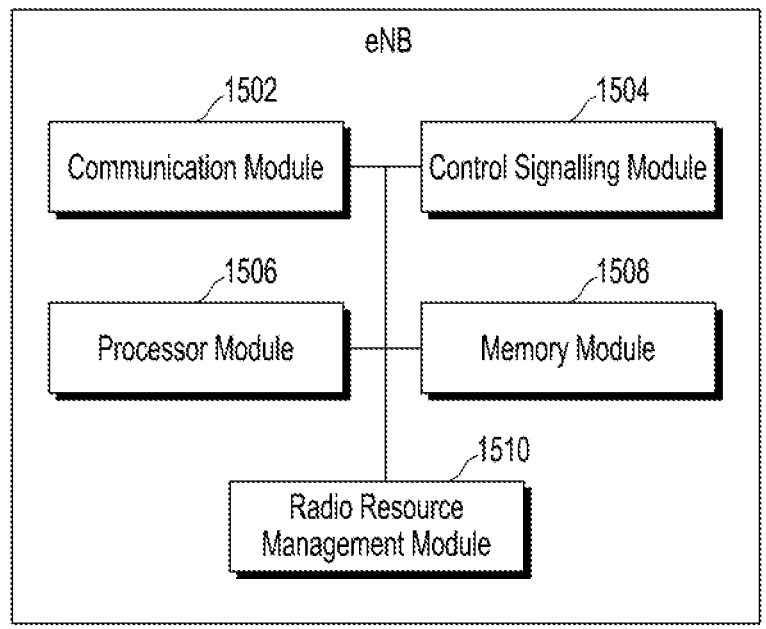
FIG. 15A is a block diagram of 5G eNB depicting the hardware and software modules for realizing the methods proposed in the present disclosure.

FIG. 15A is a block diagram of 5G eNB depicting the hardware and software modules for realizing the methods proposed in the present disclosure.

FIG. 15A is a block diagram illustrating various modules of a eNB; according to the embodiments of the present disclosure as disclosed herein. The primary blocks present in the eNB for communication with the UE include a communication module 1502, a control signaling module 1504, a processor module 1506, a memory module 1508 and a radio resource management module 1510.

In an embodiment of the present disclosure, the communication module 1502 is configured to broadcast a synchronization signal, PBCH and SBCH to plurality of UEs. In another embodiment of the present disclosure, the communication module 1502 is configured to receive and detect a probe request from plurality of UEs. In yet another embodiment of the present disclosure, the communication module 1502 is configured to transmit a probe response message to plurality of UEs. In an embodiment of the present disclosure, the communication module 1502 is configured to communicate RRC signaling to and from the UE 102. For example, the communication module 1502 in a eNB 103 can be configured to communicate the measurement configuration and RRC reconfiguration messages comprising the system information table (SIT) to one or more UEs 102a, 102b, 102c. Further, the communication module 1502 in the eNB 103 can be configured to transmit and receive data from one or more UEs 102a, 102b, 102c according to physical layer waveform and coding for a wireless system.

The control signaling module 1504 in eNB 103 can be configured to prepare the related RRC messages to be transmitted to the UE and also can be configured to parse the related RRC message received from the UE. Further, the control signaling module 1504 in eNB 103 can be configured to determine the bearer to be transmitted over within respective cells in the eNB's. The bearer described herein can either be a data radio bearer (DRB) or a signaling radio bearer (SRB). The selection of a bearer is based on several variables, which include for example, but are not limited to, quality of service requirements (QoS), traffic characteristics of the bearer, and load and coverage area of the serving cell of eNB.

The processor module 1506 depicts a computing environment implementing the method and system for system information acquisition by a UE in a 5G wireless network, according to the embodiments of the present disclosure as disclosed herein. The computing environment of the processor module 1506 comprises at least one processing unit that is equipped with a control unit and an arithmetic logic unit (ALU), a clock chip, plurality of networking devices, and a plurality input output (I/O) devices. The processor module 1506 is responsible for processing the instructions of the algorithm. The processing unit receives commands from the control unit in order to perform its processing. Further, any logical and arithmetic operations involved in the execution of the instructions are computed with the help of the ALU. The overall computing environment can be composed of multiple homogeneous or heterogeneous cores, multiple CPUs of different kinds, special media and other accelerators. The processing unit is responsible for processing the instructions of the algorithm. The algorithm comprising of instructions and codes required for the implementation are stored in either the memory module 1508 or the storage or both. At the time of execution, the instructions may be fetched from the corresponding memory module 1508 or storage unit, and executed by the processing unit. The processing unit synchronizes the operations and executes the instructions based on the timing signals generated by the clock chip. The embodiments of the present disclosure disclosed herein can be implemented through at least one software program running on at least one hardware device and performing network management functions to control the elements. The methods shown in the FIG. 14 include various units, blocks, modules, or steps described in relation with methods, processes, algorithms, or systems of the present disclosure, which can be implemented using any general purpose processor and any combination of programming language, application, and embedded processor.

Further, the memory module 1508 is also configured to store information related to operation of the eNB 103 and the UE. The memory module 1508 can be configured to store various UE related configurations when UE is in connected mode and UE capabilities for one or more UEs 102a, 102b, 102c etc.

The radio resource management module 1510 is responsible for various aspects like beam level mobility and cell level mobility etc. The radio resource management module 1510 in the eNB 103 may be configured to evaluate the handover decisions based on the BRS measurement reports sent by one or more UEs. The eNB 103 receives the measurement reports from one or more UEs 102a, 102b, 102c etc and decide to perform handover for that particular UE. Similarly, the radio resource management module 1510 in the eNB 103 can be configured to receive the CSI-RS RSRP measurements for handling the measurement set and candidate set for beam level mobility handling for one or more UEs 102a, 102b, 102c etc.

Figure 15B:
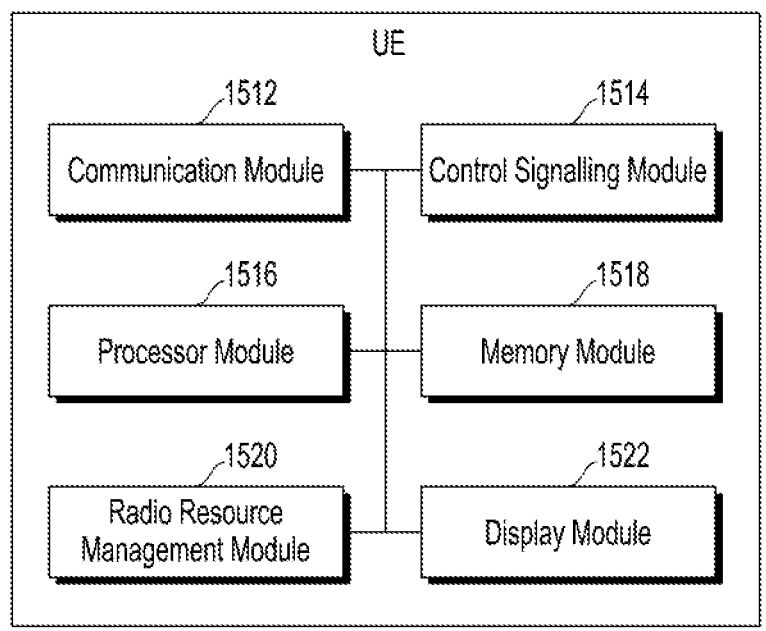
FIG. 15B is a block diagram of UE depicting the hardware and software modules for realizing the methods proposed in the present disclosure.

FIG. 15B is a block diagram of UE depicting the hardware and software modules for realizing the methods proposed in the present disclosure.

FIG. 15B is a block diagram illustrating various modules of a UE; according to the embodiments of the present disclosure as disclosed herein. The primary blocks present for communication include a communication module 1512, a control signaling module 1514, a processor module 1516, a memory module 1518, a radio resource management module 1520 and a display module 1522.

In an embodiment of the present disclosure, the communication module 1512 is configured to decode the synchronization signal, the beam index sequence, PBCH and SBCH broadcasted by eNB. In another embodiment of the present disclosure, the communication module 1512 is configured to transmit a probe request signal on the probe resource. In yet another embodiment of the present disclosure, the communication module 1512 is configured to receive a probe response message transmitted by the eNB. In an embodiment of the present disclosure, the communication module 1512 is configured to communicate RRC signaling to and from the eNB. For example, the wireless communication module 1512 in the UE 102 can be configured to communicate the request for SIT update, measurement report and RRC reconfiguration complete message to the eNB. Further, the communication module 1512 in the UE 102 can perform random access procedure on the cell of the 5G RAT served by the eNB. Further, the communication module 1512 in the UE 102 can be configured to transmit and receive data from the eNB according to physical layer waveform and coding assumed for 5G wireless system.

The control signaling module 1514 in the UE 102 can be configured to prepare the related RRC messages to be transmitted to the eNB and also can be configured to parse the related RRC message received from the eNB.

The processor module 1516 depicts a computing environment in the UE 102 for implementing a method and system for system information acquisition in a 5G wireless network, according to the embodiments of the present disclosure as disclosed herein. The computing environment of the processor module 1516 comprises at least one processing unit that is equipped with a control unit and an arithmetic logic unit (ALU), a clock chip, plurality of networking devices, and a plurality input output (I/O) devices. The processor module 1516 is responsible for processing the instructions of the algorithm. The processing unit receives commands from the control unit in order to perform its processing. Further, any logical and arithmetic operations involved in the execution of the instructions are computed with the help of the ALU. The overall computing environment can be composed of multiple homogeneous or heterogeneous cores, multiple CPUs of different kinds, special media and other accelerators. The processing unit is responsible for processing the instructions of the algorithm. The algorithm comprising of instructions and codes required for the implementation are stored in either the memory module 1518 or the storage or both. At the time of execution, the instructions may be fetched from the corresponding memory module 1518 or storage unit, and executed by the processing unit. The processing unit synchronizes the operations and executes the instructions based on the timing signals generated by the clock chip. The embodiments of the present disclosure disclosed herein can be implemented through at least one software program running on at least one hardware device and performing network management functions to control the elements. The methods shown in the FIG. 12 and FIG. 13 include various units, blocks, modules, or steps described in relation with methods, processes, algorithms, or systems of the present disclosure, which can be implemented using any general purpose processor and any combination of programming language, application, and embedded processor. Further, the memory module 1518 is also configured to store information related to UE operation. The memory module 1518 can be configured to store various configurations like probing configuration, system configuration received in probe response, system information table (SIT), measurement configuration, etc received from the eNB.

The radio resource management module 1520 in the UE 102 is responsible for various aspects like cell level mobility and beam level mobility etc. The radio resource management module 1520 in the UE 102 may be configured to evaluate the cell selection/re-selection handover events based on the BRS measurements and perform CSI-RS RSRP measurements respectively.

The display module 1522 in the UE 102 can be configured so that user can input information or information can output on the display for the user to understand some UE operations when the UE is operating in dual connectivity mode of operation. Most of the UE operations are transparent to the user and may not need user input nor output on the display.

When the embodiments are implemented by software, firmware, middleware, or a microcode, a program code, or code segments, they can be stored in a machine-readable medium, such as a storage component. The code segment may indicate a procedure, a function, a sub program, a program, a routine, a sub routine, a module, a software package, a class, or a random combination of commands, data structures, or program description sentences. The code segment may be coupled with another code segment or a hardware circuit by transmitting and/or receiving information, data, factors, parameters, or memory contents. The information, factors, parameters, and data may be transmitted using an arbitrary proper means including memory sharing, message transmission, token transmission, and network transmission.

In order to realize the software, the technologies described herein may be implemented as modules (for example, processes, functions and the like) performing the functions described herein. Software codes may be stored in memory units and executed by processors. The memory units may be implemented inside or outside the processor. In this case, the memory units can be access the processor to be communicable through various means known in the art. Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
   receiving, from a base station, master information block (MIB) including physical downlink control channel (PDCCH) configuration information associated with system information block (SIB) for an initial access and offset information associated with the SIB for the initial access, and
   receiving, from the base station, the SIB for an initial access based on the PDCCH configuration information and the offset information, the SIB for the initial access including:
      first information associated with one or more preambles, and
      second information associated with a physical random access channel (PRACH) resource; and
      third information associated with one or more SIBs set to be not broadcasted,
   selecting a preamble for a SI request based on the first information associated with the one or more preambles, wherein the preamble for the SI request is associated with at least one value identified based on the third information;
   transmitting, to the base station, the preamble for the SI request based on the second information associated with the PRACH resource; and
   receiving, from the base station, a response message associated with the preamble for the SI request, the response message including other SI,
   wherein the other SI includes SIB related to the at least one value, not received through the MIB and the SIB for the initial access.

2. The method of claim 1,
   wherein the selecting of the preamble comprises:
      selecting a downlink beam based on a reference signal received power and a threshold; and
      selecting the preamble for the SI request based on the first information and the downlink beam, and
   wherein the threshold is configured in the SIB for the initial access.

3. The method of claim 1, wherein the other SI includes at least one of:
   an SIB associated with an intra frequency cell reselection,
   an SIB associated with an inter frequency cell reselection,
   an SIB associated with an inter-radio access technology (RAT) cell reselection,
   an SIB associated with an earthquake and tsunami warning system (ETWS),
   an SIB associated with a commercial mobile alert system (CMAS), or
   an SIB associated with global positioning systems (GPS)/coordinated universal time (UTC) time.

4. The method of claim 1, wherein the SIB related to the at least one value is different from SIB periodically broadcasted on a cell.

5. A method performed by a base station in a wireless communication system, the method comprising:
   transmitting, to a terminal, master information block (MIB) including physical downlink control channel (PDCCH) configuration information associated with system information block (SIB) for an initial access and offset information associated with the SIB for the initial access, and
   transmitting, to the terminal, the SIB for an initial access based on the PDCCH configuration information and the offset information, the SIB for the initial access including:
      first information associated with one or more preambles,
      second information associated with a physical random access channel (PRACH) resource, and
      third information associated with one or more SIBs set to be not broadcasted;
   receiving, from the terminal, a preamble for a SI request based on the first information associated with the one or more preambles and the second information associated with the PRACH resource, the preamble for the SI request being associated with at least one value identified based on the third information; and
   transmitting, to the terminal, a response message associated with the preamble for the SI request, the response message including other SI,
   wherein the other SI includes SIB related to the at least one value, not received through the MIB and the SIB for the initial access.

6. The method of claim 5,
   wherein the preamble for the SI request is selected based on the first information and a downlink beam,
   wherein the downlink beam is selected based on a reference signal received power and a threshold, and
   wherein the threshold is configured in the SIB for the initial access.

7. The method of claim 5, wherein the other SI includes at least one of:
   an SIB associated with an intra frequency cell reselection,
   an SIB associated with an inter frequency cell reselection,
   an SIB associated with an inter-radio access technology (RAT) cell reselection,
   an SIB associated with an earthquake and tsunami warning system (ETWS),
   an SIB associated with a commercial mobile alert system (CMAS), or
   an SIB associated with global positioning systems (GPS)/coordinated universal time (UTC) time.

8. The method of claim 5, wherein the SIB related to the at least one value is different from SIB periodically broadcasted on a cell.

9. A terminal in a wireless communication system, the terminal comprising:
   a transceiver; and
   at least one processor configured to:
      receive, from a base station via the transceiver, master information block (MIB) including physical downlink control channel (PDCCH) configuration information associated with system information block (SIB) for an initial access and offset information associated with the SIB for the initial access,
      receive, from base station via the transceiver, the SIB for the initial access based on the PDCCH configuration information and the offset information, the SIB for the initial access including:
         first information associated with one or more preambles,
         second information associated with a physical random access channel (PRACH) resource, and third information associated with one or more SIBs set to be not broadcasted, select a preamble for a SI request, based on the first information associated with the one or more preambles, wherein the preamble for the SI request is associated with at least one value identified based on the third information, transmit, to the base station via the transceiver, the preamble for the SI request based on the second information associated with the PRACH resource, and receive, from the base station via the transceiver, a response message associated with the preamble for the SI request, the response message including other SI, wherein the other SI includes SIB related to the at least one value, not received through the MIB and the SIB for the initial access.

10. The terminal of claim 9, wherein the at least one processor is, to select the preamble, configured to:

select a downlink beam based on a reference signal received power and a threshold, and select the preamble for the SI request based on the first information and the downlink beam, and wherein the threshold is configured in the SIB for the initial access.

11. The terminal of claim 9, wherein the other SI includes at least one of:

an SIB associated with an intra frequency cell reselection, an SIB associated with an inter frequency cell reselection, an SIB associated with an inter-radio access technology (RAT) cell reselection, an SIB associated with an earthquake and tsunami warning system (ETWS), an SIB associated with a commercial mobile alert system (CMAS), or an SIB associated with global positioning systems (GPS)/ coordinated universal time (UTC) time.

12. The terminal of claim 9, wherein the SIB related to the at least one value is different from SIB periodically broadcasted on a cell.

13. A base station in a wireless communication system, the base station comprising:

a transceiver; and at least one processor configured to:

transmit, to a terminal via the transceiver, master information block (MIB) including physical downlink control channel (PDCCH) configuration information associated with system information block (SIB) for an initial access and offset information associated with the SIB for the initial access, and transmit, to the terminal via the transceiver, the SIB for the initial access based on the PDCCH configuration information and the offset information, the SIB for the initial access including:

first information associated with one or more preambles, second information associated with a physical random access channel (PRACH) resource, and third information associated with one or more SIBs set to be not broadcasted, receive, from the terminal via the transceiver, a preamble for a SI request based on the first information associated with the one or more preambles and the second information associated with the PRACH resource, the preamble for the SI request being associated with at least one value identified based on the third information, and transmit, to the terminal via the transceiver, a response message associated with the preamble for the SI request, the response message including other SI, wherein the other SI includes SIB related to the at least one value, not received through the MIB and the SIB for the initial access.

14. The base station of claim 13, wherein the preamble for the SI request is selected based on the first information and a downlink beam, wherein the downlink beam is selected based on a reference signal received power and a threshold, and wherein the threshold is configured in the SIB for the initial access.

15. The base station of claim 13, wherein the other SI includes at least one of:

an SIB associated with an intra frequency cell reselection, an SIB associated with an inter frequency cell reselection, an SIB associated with an inter-radio access technology (RAT) cell reselection, an SIB associated with an earthquake and tsunami warning system (ETWS), an SIB associated with a commercial mobile alert system (CMAS), or an SIB associated with global positioning systems (GPS)/ coordinated universal time (UTC) time.

16. The base station of claim 13, wherein the SIB related to the at least one value is different from SIB periodically broadcasted on a cell.

* * * * *